(12) United States Patent
Xiao et al.

(10) Patent No.: US 10,593,988 B2
(45) Date of Patent: Mar. 17, 2020

(54) ELECTROCHEMICAL CELL FOR LITHIUM-BASED BATTERIES

(71) Applicant: GM GLOBAL TECHNOLOGY OPERATIONS LLC, Detroit, MI (US)

(72) Inventors: Xingcheng Xiao, Troy, MI (US); John S. Wang, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 14/724,703

(22) Filed: May 28, 2015

(65) Prior Publication Data
US 2015/0263379 A1 Sep. 17, 2015

Related U.S. Application Data

(63) Continuation-in-part of application No. 13/923,354, filed on Jun. 20, 2013, now Pat. No. 9,379,418.

(51) Int. Cl.
H01M 10/0525 (2010.01)
H01M 2/16 (2006.01)
(Continued)

(52) U.S. Cl.
CPC ...... *H01M 10/0525* (2013.01); *C25D 7/0614* (2013.01); *H01M 2/1653* (2013.01);
(Continued)

(58) Field of Classification Search
CPC ........... H01M 10/0525; H01M 2/1653; H01M 10/058; H01M 4/0447; H01M 10/0445;
(Continued)

(56) References Cited

U.S. PATENT DOCUMENTS 5,601,951 A * 2/1997 Johnson ............... H01M 4/0459
429/101
8,152,865 B2 4/2012 Ando et al.
(Continued)

FOREIGN PATENT DOCUMENTS

CN 1735949 A 2/2006
CN 101855773 A 10/2010
(Continued)

OTHER PUBLICATIONS

Zhou, et al.; "Development of reliable lithium microference electrodes for long-term in situ studies of lithium-based battery systems", J. Electrochem. Soc.; 151(12); 2004; pp. A2173-A2179.
(Continued)

*Primary Examiner* — Jonathan G Jelsma
*Assistant Examiner* — Omar M Kekia
(74) *Attorney, Agent, or Firm* — Harness, Dickey & Pierce, P.L.C.

(57) ABSTRACT

An electrochemical cell is formed. The cell includes a non-lithium negative electrode in contact with a lithium ion permeable negative electrode current collector, and a positive electrode disposed in contact with a lithium ion permeable positive electrode current collector. The non-lithium negative electrode and the positive electrode are lithium ion permeable. The cell also has a lithium source electrode including lithium ions. A respective microporous polymer separator is disposed between the lithium source electrode and each of the negative and positive electrodes; or a first separator is disposed between the lithium source electrode and one of the negative and positive electrodes, and a second separator is disposed between the negative and positive electrodes. An electrolyte is introduced into the electrochemical cell. A voltage potential is applied across the electrochemical cell to pre-lithiate any of the non-lithium
(Continued)

negative electrode and positive electrode with lithium ions from the lithium source electrode.

20 Claims, 4 Drawing Sheets

(51) Int. Cl.
*C25D 7/06* (2006.01)
*H01M 10/058* (2010.01)
*H01M 10/052* (2010.01)
*H01M 4/139* (2010.01)
*H01M 10/04* (2006.01)
*H01M 4/04* (2006.01)

(52) U.S. Cl.
CPC ......... *H01M 4/0447* (2013.01); *H01M 4/139* (2013.01); *H01M 10/049* (2013.01); *H01M 10/0445* (2013.01); *H01M 10/052* (2013.01); *H01M 10/058* (2013.01); *Y02E 60/122* (2013.01); *Y02P 70/54* (2015.11)

(58) Field of Classification Search
CPC .. H01M 10/049; H01M 10/052; H01M 4/139; C25D 7/0614; Y02E 60/122; Y02P 70/54
USPC ............................................. 429/161; 205/59
See application file for complete search history.

(56) References Cited

U.S. PATENT DOCUMENTS

| | | | |
|---|---|---|---|
| 8,163,410 B2 | 4/2012 | Fulop et al. | |
| 8,268,148 B2 | 9/2012 | Kirchev | |
| 8,663,840 B2 | 3/2014 | Nazri et al. | |
| 8,974,946 B2 | 3/2015 | Cai et al. | |
| 8,999,584 B2 | 4/2015 | Jiang et al. | |
| 9,028,565 B2 | 5/2015 | Huang | |
| 9,093,705 B2 | 7/2015 | Xiao et al. | |
| 9,123,939 B2 | 9/2015 | Xiao et al. | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,350,046 B2 | 5/2016 | Huang | |
| 9,362,551 B2 | 6/2016 | Sachdev et al. | |
| 9,362,552 B2 | 6/2016 | Sohn et al. | |
| 9,379,418 B2 | 6/2016 | Wang et al. | |
| 9,412,986 B2 | 8/2016 | Huang | |
| 9,537,144 B2 | 1/2017 | Huang et al. | |
| 9,705,154 B2 | 7/2017 | Lee et al. | |
| 2003/0113618 A1* | 6/2003 | Xing ................... | H01M 2/021 429/129 |
| 2006/0057433 A1* | 3/2006 | Ando ................... | H01G 9/155 429/9 |
| 2006/0286458 A1 | 12/2006 | Sato et al. | |
| 2007/0002523 A1 | 1/2007 | Ando et al. | |
| 2009/0104510 A1 | 4/2009 | Fulop et al. | |
| 2009/0208834 A1* | 8/2009 | Ramasubramanian . | H01M 4/13 429/149 |
| 2010/0216027 A1 | 8/2010 | Fujii | |
| 2011/0025047 A1 | 2/2011 | Zelechonok et al. | |
| 2011/0086267 A1 | 4/2011 | Yamamoto et al. | |
| 2011/0177398 A1* | 7/2011 | Affinito ................ | H01M 4/134 429/325 |
| 2011/0250478 A1 | 10/2011 | Timmons et al. | |
| 2012/0088129 A1* | 4/2012 | Kaneda ................ | H01M 4/131 429/59 |
| 2012/0107680 A1* | 5/2012 | Amiruddin ........... | H01M 4/386 429/206 |
| 2012/0229096 A1 | 9/2012 | Nazri | |
| 2012/0231321 A1 | 9/2012 | Huang et al. | |
| 2012/0263986 A1 | 10/2012 | Fulop et al. | |
| 2013/0009604 A1 | 1/2013 | Bhardwaj et al. | |
| 2013/0284338 A1 | 10/2013 | Xiao et al. | |
| 2014/0272526 A1 | 9/2014 | Huang | |
| 2014/0272558 A1 | 9/2014 | Xiao et al. | |
| 2014/0375325 A1 | 12/2014 | Wang et al. | |
| 2015/0014890 A1 | 1/2015 | Xiao | |
| 2015/0056387 A1 | 2/2015 | Dadheech et al. | |
| 2016/0111721 A1 | 4/2016 | Xiao et al. | |

FOREIGN PATENT DOCUMENTS

| | | |
|---|---|---|
| CN | 102084519 A | 6/2011 |
| CN | 102473984 A | 5/2012 |
| CN | 103190026 A | 7/2013 |
| CN | 103390764 A | 11/2013 |
| CN | 104584278 A | 4/2015 |
| CN | 105308786 A | 2/2016 |
| CN | 106207264 A | 12/2016 |
| EP | 1577914 A1 | 9/2005 |
| EP | 1950780 A1 | 7/2008 |
| EP | 2369658 A1 | 9/2011 |
| EP | 3011628 A1 | 4/2016 |
| JP | 2007193986 A | 8/2007 |
| JP | 2010080299 A | 4/2010 |
| JP | 2011003318 | 1/2011 |
| JP | 2011003318 A | 1/2011 |
| WO | WO-2014204479 A1 | 12/2014 |

OTHER PUBLICATIONS

Shizukuni Yata et al.; "Evaluation of Positive Electrode Resistance by "Current-Rest-Method" Using "Four-electrode Cell" (C0-, Ni- and Mn- based Cathode Materials)"; Electrochemistry, vol. 78, No. 5; Mar. 26, 2012; pp. 400-402.

European Search Report for EP Application No. 20130887356 dated Oct. 14, 2016; 10 pages.

International Search Report and Written Opinion for PCT Application No. PCT/US2013/046926 dated Mar. 21, 2014; 8 pages.

Second Office Action for Chinese Patent Application No. 201380077473.5 dated Nov. 6, 2017 with English language machine translation, 19 pages.

First Office Action for Chinese Patent Application No. 201610318176.0 dated May 3, 2018 with English language machine translation, 26 pages.

Second Office Action for Chinese Patent Application No. 201610318176.0 dated Dec. 12, 2018 with correspondence dated Dec. 14, 2018 from China Patent Agent (H.K.) Ltd. summarizing contents, 14 pages.

* cited by examiner

ELECTROCHEMICAL CELL FOR LITHIUM-BASED BATTERIES

CROSS-REFERENCE TO RELATED APPLICATIONS

This application is a continuation-in-part of U.S. patent application Ser. No. 13/923,354, filed Jun. 20, 2013, which is incorporated by reference herein in its entirety.

BACKGROUND

Secondary, or rechargeable, lithium ion batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An electrochemical cell is formed. The electrochemical cell includes a non-lithium negative electrode disposed in contact with a lithium ion permeable negative electrode current collector. Also, the electrochemical cell includes a positive electrode disposed in contact with a lithium ion permeable positive electrode current collector. The non-lithium negative electrode and the positive electrode are lithium ion permeable. The electrochemical cell also has a lithium source electrode including lithium ions. A respective microporous polymer separator is disposed between the lithium source electrode and each of the non-lithium negative electrode and the positive electrode; or a first microporous polymer separator is disposed between the lithium source electrode and one of the non-lithium negative electrode and the positive electrode, and a second microporous polymer separator is disposed between the non-lithium negative electrode and the positive electrode. An electrolyte is introduced into the electrochemical cell. A voltage potential is applied across the electrochemical cell to pre-lithiate any of the non-lithium negative electrode and the positive electrode with lithium ions from the lithium source electrode.

Examples of the electrochemical cell disclosed herein may form a lithium ion battery or a lithium sulfur battery.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
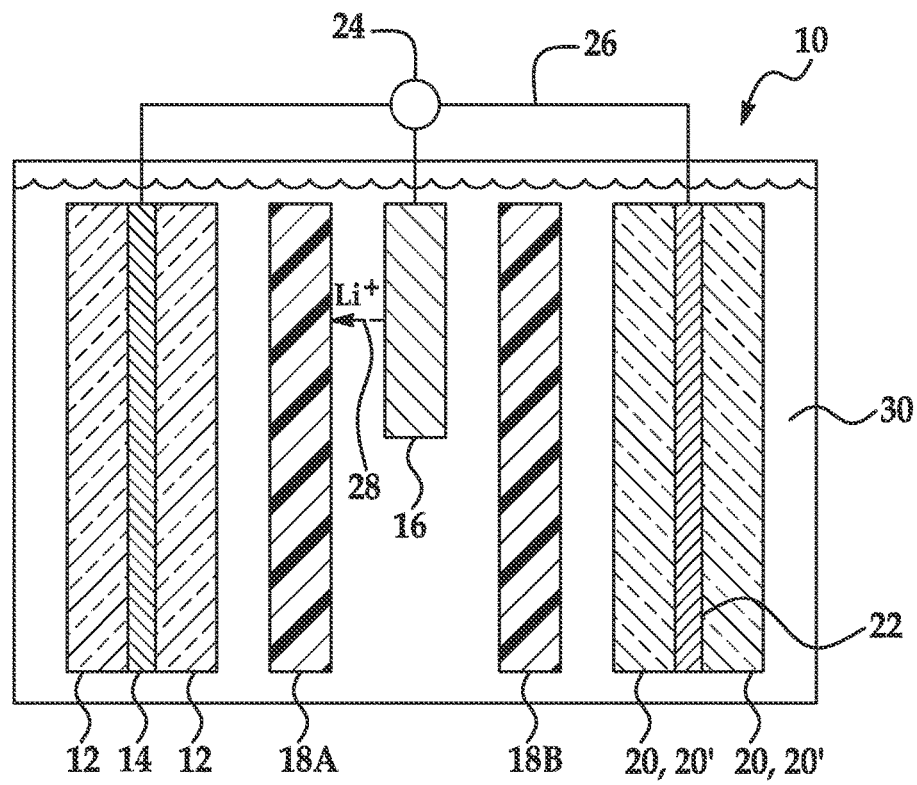
FIG. 1 is a cross-sectional view of an example of an electrochemical cell disclosed herein.

The lithium-based batteries generally operate by reversibly passing lithium ions between a negative electrode (sometimes called an anode) and a positive electrode (sometimes called a cathode). The negative and positive electrodes are situated on opposite sides of a microporous polymer separator soaked with an electrolyte solution that is suitable for conducting the lithium ions. Each of the electrodes is also associated with respective current collectors, which are connected by an interruptible external circuit that allows an electric current to pass between the negative and positive electrodes. Additionally, a reference electrode may be introduced into the lithium-based battery to monitor the state of charge of the positive electrode, the negative electrode, or both electrodes.

In some instances, prior to forming a functional lithium-based battery, the negative electrode is pre-lithiated by adding the negative electrode to a half-cell soaked in an electrolyte. A voltage potential is applied to the half-cell to complete the pre-lithiation of the negative electrode. When the negative electrode is pre-lithiated in a half-cell, additional manufacturing steps are included to form the lithium-based battery. The additional steps include removing the negative electrode from the half-cell, and then cleaning, drying, and placing the negative electrode into a lithium-based battery that includes the other components described above. The additional steps to form the full cell may increase the cost of production, and may also reduce the life cycling of the lithium-based battery by exposing the negative electrode to moisture or oxygen gas in the air. The negative electrode may also be damaged during the cleaning and drying process prior to being inserted into the full electrochemical cell.

Moreover, during the additional steps to form the lithium-based battery, moving the negative electrode to the battery may be difficult. This may be due, in part, to deformation of the negative electrode from the large volume expansion of the negative electrode active material during the pre-lithiation. It has been found that negative electrode active materials (e.g., silicon particles) with high specific capacities also have large volume expansion during pre-lithiation (i.e., the initial charging) of the negative electrode in the half-cell. The large volume change (e.g., about 300%) experienced by the negative electrode active material during the pre-lithiation causes the negative electrode active material to expand. The expansion of the negative electrode active material may cause the negative electrode to deform. As an example, the deformation may change the curvature of the negative electrode. The altered curvature of the negative electrode may render the electrode more difficult to transfer into the lithium-based battery.

To form examples of the electrochemical cell herein, the method includes forming an electrochemical cell that may be pre-lithiated in-situ to form a lithium ion or lithium sulfur battery. The electrochemical cell includes a non-lithium negative electrode and a positive electrode, which are lithium ion permeable. At the outset of the method (i.e., prior to pre-lithiation), in some instances, the electrodes do not include lithium. Due, in part, to the lithium ion permeability of the non-lithium electrodes, in-situ pre-lithiation can occur. The in-situ pre-lithiation eliminates the need to perform any additional manufacturing steps to form the full electrochemical cell (e.g., the lithium-based battery). By eliminating any additional manufacturing steps, the life cycle of the lithium-based battery may be extended, in part because it is not exposed to oxygen gas or moisture in the air. Additionally, the in-situ pre-lithiation eliminates the previously mentioned cleaning and drying processes that may be performed after pre-lithiating in a half-cell, and thus eliminates the possibility of deformation resulting therefrom.

In an example of the method disclosed herein, an electrochemical cell 10 may be formed. An example of the electrochemical cell 10 that may be formed is shown in FIG. 1. In this example, the electrochemical cell 10 includes non-lithium negative electrode 12 in contact with a lithium ion permeable negative electrode current collector 14. The electrochemical cell 10 also includes a positive electrode 20, 20' in contact with a lithium ion permeable positive electrode current collector 22. The electrochemical cell 10 further includes a lithium source electrode 16 with first and second microporous polymer separators 18A, 18B disposed between the lithium source electrode 16 and each of the non-lithium negative electrode 12 and the positive electrode 20, 20'.

In an example, the non-lithium negative electrode 12 includes a non-lithium containing negative active material. The non-lithium containing negative active material does not contain lithium. In an example, the negative active material may be selected from the group consisting of graphite or another electron-conducting carbon, coke, soft carbons, hard carbons, amorphous carbon, silicon, aluminum, tin, or alloys of Si, Al, and/or Sn, a silicon-carbon composite, silicon oxide (e.g., $SiO_x$ x<2), tin oxide, and titanium oxide. Some examples of electron-conducting carbon include natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

It is to be understood that the non-lithium negative electrode 12 is lithium ion permeable. This permeability is due, in part to the negative active material, which, while not being formed of lithium, is permeable to lithium ions. Additionally, the non-lithium negative electrode 12 may be porous, and the pores may allow lithium ions to permeate the negative electrode 12.

The non-lithium negative electrode 12 may further include a binder and a conductive filler. The binder may be included to aid in adhering the negative active material together as well as to aid in the adhesion of the non-lithium negative electrode 12 to the lithium ion permeable negative electrode current collector 14. The choice of binder material may vary widely so long as it is inert with respect to the other materials in the negative electrode 12. Some examples of the binder used in the non-lithium negative electrode 12 may include polytetrafluoroethylenes, polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, acrylates, methacrylates, divinyl ethers, or any other suitable binder material known to skilled artisans. Other suitable binders include polyvinyl alcohol (PVA), sodium alginate, or other water-soluble binders.

The conductive filler may be included to ensure electron conduction between the lithium ion permeable negative electrode current collector 14 and the negative active material. Some examples of the conductive filler may be a high surface area carbon, such as acetylene black (i.e., carbon black). Other examples of suitable conductive fillers include graphene, graphite, carbon nanotubes, activated carbon fibers, non-activated carbon fibers, metal flakes, metal powders, metal fibers, carbon fabrics, metal mesh, and electrically conductive polymers. In yet another example, a combination of conductive fillers is used, such as carbon black and carbon nanofibers.

The non-lithium containing negative electrode 12 may be formed by applying a slurry of the electrode components to the lithium ion permeable negative electrode current collector 14, then drying the slurry to form the non-lithium containing negative electrode 12. In an example, the slurry of electrode components is applied to both sides of the lithium ion permeable negative current collector 14. In another example, the slurry may be applied to one side, and may penetrate the pores of the current collector 14 to substantially coat the other side of the current collector 14. In either example, it is to be understood that the slurry of electrode components may also substantially fill the pores of the lithium ion permeable negative electrode current collector 14 as well as coat the sides.

In an example, the lithium ion permeable negative electrode current collector 14 may be formed from copper mesh, nickel mesh, porous carbon paper (e.g., made up of nanofibers, nanotubes, fibers, and/or graphene), or any other appropriate electrically conductive material. It is to be understood that the negative electrode current collector 14 may be in any form that allows lithium ions to pass through the current collector 14. As examples, the lithium ion permeable negative electrode current collector 14 may be in the form of a foam, grid, net, woven fiber, honeycomb, patterned holes on metal foil, perforated holes on metal foil, metallized plastic film, expanded metal grid, metal wool, micro-truss, woven carbon fabric, woven carbon mesh, non-woven carbon mesh, carbon felt, or combinations thereof. The current collector 14 may have an average pore size ranging from about 1 nm to about 10 μm. The current collector 14 may be characterized by an average pore-to-surface ratio or porosity ranging from about 0.1% to about 99.9%. In an example, the average pore-to-surface ratio or porosity is at least 10%. The lithium ion permeable negative electrode current collector 14 that is selected should be lithium ion permeable and capable of collecting and moving free electrons to and from an external circuit connected thereto.

An example of the positive electrode 20, 20' includes a positive active material, a binder, and a conductive filler. The binder and conductive filler of the positive electrode 20, 20' may be selected from the same examples of binder and conductive filler described herein for the non-lithium negative electrode 12.

In some examples, the positive electrode 20 may be formed from a non-lithium containing positive active material that may function as the positive electrode for a lithium ion battery. One common class of known non-lithium positive active materials suitable for the positive electrode 20 includes layered transitional metal oxides. Some specific examples of the positive active materials include manganese oxide ($Mn_2O_4$), cobalt oxide ($CoO_2$), a nickel-manganese oxide spinel, a layered nickel-manganese-cobalt oxide, or an iron polyanion oxide, such as iron phosphate ($FePO_4$) or iron fluorophosphate ($FePO_4F$), or vanadium oxide ($V_2O_5$). A non-lithium positive electrode 20 may be desirable when the positive electrode 20 is the electrode 20 to be pre-lithiated using the example methods disclosed herein.

In some other examples, the positive electrode active material for the lithium ion battery may be a lithium-containing active material. In these instances, the positive electrode is not pre-lithiated, but rather includes some amount of lithium less than the total capacity of the positive electrode (e.g., from about 10% to about 50% of the total capacity). A lithium-based positive electrode may help compensate for lithium loss resulting from the formation of a solid electrolyte interphase (SEI) layer and/or other side reaction.

Some examples of lithium-containing active material for the lithium ion battery positive electrode include spinel lithium manganese oxide ($LiMn_2O_4$), lithium cobalt oxide ($LiCoO_2$), a nickel-manganese oxide spinel ($Li(Ni_{0.5}Mn_{1.5})O_2$), or a layered nickel-manganese-cobalt oxide (having a general formula of $xLi_2MnO_3 \cdot (1-x)LiMO_2$ or (M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium active materials include $Li(Ni_{1/3}Mn_{1/3}Co_{1/3})O_2$, $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$). Still other lithium-based active materials may also be utilized, such as $LiNi_xM_{1-x}O_2$ (M is composed of any ratio of Al, Co, and/or Mg, for example, lithium nickel cobalt aluminum oxide ($LiNi_{0.8}Co_{0.15}Al_{0.05}O_2$) or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (M is composed of any ratio of Co, Fe, and/or Mn), and any other high efficiency lithium nickel-manganese-cobalt material (e.g., NMC or $LiNiMnCoO_2$). By "any ratio" it is meant that any element may be present in any amount. So, for example, M could be Al, with or without Co and/or Mg, or any other combination of the listed elements.

In another example, the positive electrode 20' may be formed from a non-lithium containing positive active material that may function as the positive electrode for a lithium sulfur battery. In this example, the non-lithium containing positive active material may be sulfur-based active material. In an example, the sulfur-based active material is a sulfur-carbon composite. In an example, the sulfur-carbon composite has a weight ratio of S to C that ranges from 1:9 to 9:1. Some other examples of the sulfur-based active material include $S_8$, copper sulfide, or iron sulfide.

In yet another example, the positive electrode 20' may be formed from a lithium containing active material. The lithium containing active material may be a lithium sulfur-based active material, such as a lithium sulfur-carbon composite. In another example, the lithium containing sulfur-based active material may be $Li_2S_8$, $Li_2S_6$, $Li_2S_4$, $Li_2S_2$, or $Li_2S$.

It is to be understood that the positive electrode 20, 20' is lithium ion permeable. This permeability is due, in part to the positive active material, which is permeable to lithium ions. Additionally, the positive electrode 20, 20' may be porous, and the pores may allow lithium ions to permeate the positive electrode 20, 20'.

The positive electrode 20, 20' may be formed by applying a slurry of the components to the lithium ion permeable positive electrode current collector 22, and then drying the slurry to form the non-lithium containing positive electrode 20, 20'. In an example, the slurry of electrode components is applied to both sides of the lithium ion permeable positive current collector 22. In another example, the slurry may be applied to one side, and may penetrate the pores of the current collector 14 to substantially coat the other side of the current collector 14. In either example, it is to be understood that the slurry of electrode components may also substantially fill the pores of the lithium ion permeable positive electrode current collector 22 as well as coat the sides.

In an example, the lithium ion permeable positive electrode current collector 22 may be formed from aluminum mesh, nickel mesh, porous carbon paper (e.g., made up of nanofibers, nanotubes, fibers, and/or graphene), or any other appropriate electrically conductive material. It is to be understood that the lithium ion permeable positive electrode current collector 22 may be in any form that allows lithium ions to pass through the current collector 22. As examples, the lithium ion permeable positive electrode current collector 22 may be in the form of a foam, grid, net, woven fiber, honeycomb, patterned holes on metal foil, perforated holes on metal foil, metallized plastic film, expanded metal grid, metal wool, micro-truss, woven carbon fabric, woven carbon mesh, non-woven carbon mesh, carbon felt, or combinations thereof. The current collector 22 may have an average pore size ranging from about 1 nm to about 10 µm. The current collector 22 may be characterized by an average pore-to-surface ratio or porosity ranging from about 0.1% to about 99.9%. In an example, the average pore-to-surface ratio or porosity is at least 10%. The lithium ion permeable positive electrode current collector 22 that is selected should be lithium ion permeable and capable of collecting and moving free electrons to and from an external circuit connected thereto.

In the example shown in FIG. 1, the electrochemical cell 10 has two microporous polymer separators 18A, 18B. The microporous polymer separators 18A, 18B operate as both an electrical insulator and a mechanical support. One microporous polymer separator 18A is sandwiched between the non-lithium negative electrode 12 and the lithium source electrode 16. The other microporous polymer separator 18B is sandwiched between the positive electrode 20, 20' and the lithium source electrode 16. The microporous polymer separators 18A, 18B prevent physical contact between each of the two electrodes 12, 20, 20' and the reference electrode 16, and the occurrence of a short circuit. In addition to providing a physical barrier between the electrodes 12, 20, 20', 16, the microporous polymer separators 18A, 18B ensure passage of lithium ions (identified by $Li^+$ 28) and related anions (not shown) through an electrolyte solution 30 (discussed in greater detail below) filling their pores. This helps ensure that the electrochemical cell 10 functions properly.

Each of the microporous polymer separators 18A, 18B may be any suitable material. In an example, the separators 18A, 18B may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the microporous polymer separator 18A, 18B may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the microporous polymer separator 18 may be chosen from a combination of the polyolefin (such as PE and/or PP) and one or more of the polymers listed above.

The microporous polymer separators 18A, 18B may contain a single layer or a multi-layer laminate fabricated from either a dry or wet process. For example, a single layer of the polyolefin and/or other listed polymer may constitute the entirety of the microporous polymer separator 18A, 18B. As another example, however, multiple discrete layers of similar or dissimilar polyolefins and/or polymers may be assembled into the microporous polymer separator 18A, 18B. In one example, a discrete layer of one or more of the polymers may be coated on a discrete layer of the polyolefin to form the microporous polymer separator 18A, 18B. Further, the polyolefin (and/or other polymer) layer, and any other optional polymer layers, may further be included in the microporous polymer separator 18A, 18B as a fibrous layer to help provide the microporous polymer separator 18A, 18B with appropriate structural and porosity characteristics. Still other suitable microporous polymer separators 18A, 18B include those that have a ceramic layer attached thereto, and those that have ceramic filler in the polymer matrix (i.e., an organic-inorganic composite matrix).

The lithium source electrode 16 may first be used to provide a source of lithium ions 28 during pre-lithiation of the non-lithium negative electrode 12, the positive electrode 20, 20', or both electrodes 12, 20, 20' separately. In one example, a voltage potential (which may be varied while current remains constant) is applied between the reference electrode 16 and the non-lithium negative electrode 12 during pre-lithiation of the non-lithium negative electrode 12. In this example, the lithium ions 28 flow from the source electrode 16 to the non-lithium negative electrode 12 during pre-lithiation (discussed further below). The flow of lithium ions 28 to the negative electrode 12 causes the negative electrode 12 to become lithiated, and thus provides an initial charged state for the electrochemical cell 10 once pre-lithiation is complete. During pre-lithiation, it is to be understood that the amount of lithium added to the non-lithium negative electrode 12 does not exceed 110% of the capacity of the non-lithium negative 12. Lithiating beyond the capacity of the negative electrode 12 may be desirable to compensate for irreversible lithium loss during battery cycling. The electrochemical cell 10 may then be discharged, so that the lithium ions in the negative electrode 12 are driven toward the positive electrode 20, 20, which becomes lithiated.

When pre-lithiating the non-lithium negative electrode 12 (or during the first few battery cycles), a solid electrolyte interface (SEI) layer may form. Formation of the SEI layer typically results in loss of lithium from the positive electrode 20, 20, in part because lithium from this electrode 20, 20' may be partially consumed (e.g., up to 10% lithium loss) during the SEI formation. In the examples disclosed herein however, the lithium source electrode 16 is utilized to compensate the lithium loss due to SEI formation. One or more components in the electrolyte are active and readily decompose during pre-lithiation or the first few cycles. When the voltage potential is applied to the cell during the pre-lithiation process or the first few cycles, at least some component in the electrolyte is decomposed and reacts with lithium from the lithium source electrode 16. The decomposition product deposits on the exposed surface(s) of the negative electrode 12 to form the SEI layer. Examples of the decomposition product may be LiF, $Li_2CO_3$, LiO, $Li_xPF_yO_z$, F-replaced Lithium Ethylene Di Carbonate (F-LEDC), an unsaturated polyolefin, etc. In this example, the lithium source electrode 16 compensates for the irreversibly lithium loss from the positive electrode 20, 20'.

In another example, a voltage potential (which may be varied while current remains constant) is applied between the reference electrode 16 and the positive electrode 20, 20' during pre-lithiation. In this example, the lithium ions 28 flow from the source electrode 16 to the positive electrode 20, 20' during pre-lithiation (discussed further below). The flow of lithium ions 28 to the positive electrode 20, 20' causes the positive electrode 20, 20' to become lithiated, and thus provides an initial discharged state for the electrochemical cell 10 once pre-lithiation is complete. During pre-lithiation, it is to be understood that the amount of lithium added to the positive electrode 20, 20' does not exceed 110% of the capacity of the positive electrode 20, 20'. Lithiating beyond the capacity of the negative electrode 12 may be desirable to compensate for irreversible lithium loss during battery cycling. The electrochemical cell 10 may then be charged, so that the lithium ions in the positive electrode 20, 20' are driven toward the non-lithium negative electrode 12, which becomes lithiated. When the positive electrode 20, 20' is to be pre-lithiated, the active material utilized in the positive electrode 20, 20' may be the non-lithium positive electrode active materials.

In yet another example, a voltage potential (which may be varied while current remains constant) is applied between the reference electrode 16 and the non-lithium negative electrode 12 or the positive electrode 20, 20' to partially pre-lithiate the electrode 12 or 20, 20'. After one of the electrodes 12 or 20, 20 is partially pre-lithiated, then the voltage potential is applied between the lithium source electrode 16 and the other electrode 20, 20' or 12 to partially pre-lithiate the other electrode 20, 20' or 12 (discussed in further detail below). The flow of lithium ions 28 into the respective electrodes separately causes each electrode 12, 20, 20' to become partially pre-lithiated, and thus provides an initial partial charged/partial discharged state for the electrochemical cell 10 once partial pre-lithiation is complete. When partial lithiation of both electrode 12 and 20, 20' is utilized, it is to be understood that the total percentage of lithiation in both electrodes 12, 20, 20' does not exceed 110% of the capacity of either electrode 12, 20, 20'. The electrochemical cell 10 may then be charged or discharged, so that the lithium ions in the electrode 12, 20, 20' move into the other electrode 20, 20' or 12 which becomes fully lithiated.

In an example, the lithium source electrode 16 may be selected from the group consisting of lithium metal; lithiated carbon; a lithium-silicon alloy; a lithium-aluminum alloy; a lithium-tin alloy; lithium-metal oxides having a formula $LiMO_2$, where M is selected from the group consisting of Co, Ni, Mn, and combinations thereof; lithium-metal oxides having a formula $LiM_2O_4$, where M is selected from the group consisting of Mn, Ti, and combinations thereof; lithium-metal oxides having a formula $LiM_xM'_{2-x}O_4$, where M and M' are independently selected from the group consisting of Mn and Ni and $0.1 < x < 0.9$; lithium-metal phosphates having a formula $LiMPO_4$, where M is selected from the group consisting of Fe, Mn, Co, and combinations thereof; and combinations thereof.

While not shown in the figures, it is to be understood that the lithium source electrode 16 may be positioned in contact with a suitable current collector, such as copper foil. In some instances, when the lithium source electrode 16 is positioned in between two or more electrodes or sub-cells, the current collector of the lithium source electrode 16 may be lithium ion permeable as previously disclosed herein. As examples, the lithium source electrode 16 may be a mesh, a cloth, a net made of similar metals or non-metals (e.g., graphene, carbon nanofiber paper, carbon cloth, etc.

The lithium source electrode 16 may be rather large in terms of its "projected area," which means the geometric area of the surface as projected toward the negative electrode 12 or positive electrode 20, 20'. The lithium source electrode 16 may have a projected area that is at least about 10%, 20%, 30%, 40%, 50%, 60%, 70%, 80%, 90%, 100% or more of the area of the negative electrode 12 or positive electrode 20, 20'.

In one example, the mass of the lithium ions 28 in the lithium source electrode 16 is controlled to provide a specific amount of lithium ions 28. The mass may be based on the capacity of the non-lithium negative electrode 12 or the positive electrode 20, 20' that is to be lithiated. In another example, the mass of the lithium ions 28 in the lithium source electrode 16 may be controlled so that the mass of the lithium ions 28 may be slightly in excess of the lithium ions 28 needed to pre-lithiate the non-lithium negative electrode 12 and/or the positive electrode 20, 20'. In an example, the lithium ions 28 may be present in the lithium source electrode 16 in an amount ranging from about 10% to about 50% greater than the capacity of the electrode 12 or 20, 20' to be lithiated. In other words, if the maximum lithium mass capacity of the non-lithium negative electrode 12 or the positive electrode 20, 20' is X, the amount of lithium ions 28 in the lithium source electrode 16 may range from X+10% X to X+50% X. For example, if a non-lithium negative or positive electrode 12, 20, 20' has a capacity of 2 Amp-Hours (Ah), equaling a maximum of 0.6 grams of lithium, the range of the mass of lithium ions 28 in the lithium source electrode 16 may be from about 0.66 grams to about 0.9 grams.

In instances when the mass of the lithium ion 28 in the lithium source electrode 16 is slightly in excess, the excess lithium ion 28 may be used to relithiate the non-lithium negative electrode 12 or the positive electrode 20, 20', or both electrodes 12, 20, 20' with lithium ions 28. In one example, the relithiation may occur after the cycling of the electrochemical cell 10 through discharge and charge cycles, which results in an irreversible loss of lithium ions 28 due, in part, to side reactions. For example, the excess mass of lithium ions 28 in the lithium source electrode 16 may be used as a lithium reservoir until it is desirable to relithiate one of the electrodes 12, 20, 20' to increase the life of the electrochemical cell 10. To relithiate, in any example previously mentioned, an appropriate voltage potential may be applied across the lithium source electrode 16 and the electrode 12, 20, 20' being relithiated in order to drive the lithium ions 28 toward the appropriate electrode 12, 20, 20'.

In yet another example, the lithium source electrode 16 may not be used for pre-lithiation, but rather is used for relithiation of the non-lithium negative electrode 12 or the positive electrode(s) 20, 20'. In these instances, the positive electrode 20, 20' will include enough of the lithium containing active material to render the cell 10 in an at least partially discharged state. Therefore, the pre-lithiation of the non-lithium negative electrode 12 and the positive electrode 20, 20' may not be required. The electrochemical cell 10 may first be charged (which will likely form the SEI layer). The lithium source electrode 16 may be used to relithiate the negative or positive electrodes 12, 20, 20' after formation of the SEI layer or at any time to compensate for the lithium loss and maintain the capacity retention of the electrochemical cell 10.

The lithium source electrode 16 may also function as a reference electrode in a lithium-based battery. The use of the lithium source electrode 16 as the reference electrode will be discussed in further detail below.

Any appropriate electrolyte 30 that can conduct lithium ions between the non-lithium negative electrode(s) 12 and the positive electrode(s) 20, 20' may be used in the electrochemical cell 10. In one example, the electrolyte 30 may be a non-aqueous liquid electrolyte solution that includes a lithium salt. The non-aqueous liquid may vary, depending upon the type of electrochemical cell 10. For example, when the cell 10 is a lithium ion battery cell, the non-aqueous liquid electrolyte solution may be an organic solvent or a mixture of organic solvents. Examples of suitable organic solvents include cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), dioxane, acetonitrile, nitromethane, ethyl monoglyme, phosphoric triesters, trimethoxymethane, dioxolane derivatives, 3-methyl-2-oxazolidinone, propylene carbonate derivatives, tetrahydrofuran derivatives, ethyl ether, 1,3-propanesultone, N-methyl acetamide, acetals, ketals, sulfones, sulfolanes, aliphatic ethers, cyclic ethers, glymes, polyethers, phosphate esters, siloxanes, dioxolanes, N-alkylpyrrolidones, and mixtures thereof. For another example, when the cell 10 is a lithium sulfur battery cell, the non-aqueous liquid electrolyte solution may be an ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), ethyl ether, aliphatic ethers, polyethers, and mixtures thereof.

Whether used in a lithium ion battery or a lithium sulfur battery, the electrolyte 30 includes the previously mentioned lithium salt. Examples of lithium salts that may be dissolved in the organic solvent or the ether include $LiSBF_6$, $LiClO_4$, $LiAlCl_4$, LiI, LiBr, LiCl, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, and mixtures thereof.

The concentration of the salt is not particularly limited, but in an example may range from about 0.1 mol/L to about 5 mol/L of the electrolytic solution.

The electrochemical cell 10 also includes an external circuit 26 and a load 24. The application of the load 24 to the electrochemical cell 10 closes the external circuit 26 and connects the non-lithium negative electrode(s) 12 and the positive electrode(s) 20, 20'. The closed external circuit 26 enables a voltage potential to be applied across the electrochemical cell 10 while the current is held constant. As an example, the voltage potential may be applied by connecting the electrochemical cell 10 to an external battery charger.

The voltage potential may be controlled so that the lithium ions 28 move towards the non-lithium negative electrode 12 (shown by the "$Li^+ \leftarrow$") or the positive electrode 20, 20' (not shown in FIG. 1). It is to be understood that the non-lithium negative electrode 12 or the positive electrode 20, 20' may be pre-lithiated by applying a voltage potential, under a constant current, between the lithium source electrode 16 and whichever electrode 12 or 20, 20' is being pre-lithiated. In this example, as the lithium ions 28 are carried from the lithium source electrode 16 by the electrolyte 30 across the porous separator 18A toward the non-lithium negative electrode 12, electrons flow toward the lithium ion permeable negative electrode current collector 14 through the external circuit 26. The electrons and the lithium ions 28 are united at the non-lithium negative electrode 12, thereby lithiating the negative active material with intercalated, plated, alloyed, etc. lithium for consumption during the first battery discharge cycle. In an example, when the voltage potential is applied, the lithium ions 28 are dissolved (or de-plated) from the lithium source electrode 16 and are inserted into the negative electrode active material within the electrolyte 30 (which can conduct the lithium ions). In an example, the lithium ions 28 can alloy with graphite active material or silicon-based active material. This lithiates the non-lithium negative electrode 12 in situ to form a lithiated negative electrode (not shown).

In an example, a constant current may be used and the voltage potential may be varied for lithiating the non-lithium negative electrode 12. For example, if the non-lithium negative electrode 12 is the electrode being pre-lithiated, the voltage applied between the reference electrode 16 and the non-lithium negative electrode 12 ranges from about 0.005V to about 2.0V, and the current is constant. In one example, the voltage applied between the reference electrode 16 and the non-lithium negative electrode 12 is about 1.5V. The non-lithium negative electrode 12 may be pre-lithiated until the amount of lithium reaches capacity or up to 10% beyond the capacity. Pre-lithiation may also take place until a cut-off voltage is reached. Once the cut-off voltage is reached, the pre-lithiation is complete and the constant current may be removed (i.e., current flow ceases). In an example, the cut-off voltage for the non-lithium negative electrode 12 may be slightly above 0V versus Li+/Li. It is to be understood that the cut-off voltage varies depending on the type of material used in the non-lithium negative electrode 12.

In another example, if the positive electrode 20, 20' is the electrode being pre-lithiated, the voltage applied between the reference electrode 16 and the positive electrode 20, 20' ranges from about 1.5V to about 5.0V, and the current is constant. The non-lithium positive electrodes 20, 20' may be pre-lithiated until the amount of lithium reaches capacity or up to 10% beyond the capacity. Pre-lithiation may also take place until a cut-off voltage is reached. Once the cut-off voltage is reached, the pre-lithiation is complete and the constant current may be removed (i.e., current flow ceases). In an example, the cut-off voltage for the positive electrodes 20, 20' may be slightly above 1V versus Li+/Li.

After applying the voltage potential for a predetermined amount of time, until a particular capacity is reached, and/or until a cut-off voltage is reached, the non-lithium negative electrode 12 or the positive electrode 20, 20' becomes lithiated. Pre-lithiating the non-lithium negative electrode 12 (and not the positive electrode 20, 20') renders the electrochemical cell 10 in a charged state. The external circuit 26 may then be closed to cause the electrochemical cell 10 to discharge. During discharge, the lithiated negative electrode of the electrochemical cell 10 contains a high concentration of inserted (e.g., intercalated, alloyed, etc.) lithium while the positive electrode 20, 20' has not yet been lithiated or includes less than its capacity in the form of lithium active material. The establishment of the closed external circuit 26 causes the extraction of inserted lithium from the lithiated negative electrode. The extracted lithium atoms are split into lithium ions 28 and electrons as they leave a host (i.e., the active material) at the negative electrode-electrolyte interface.

The chemical potential difference between the positive electrode 20, 20' and the lithiated negative electrode (ranging from about 0.005V to about 2.0V for the lithiated negative electrode and 1.5V to about 5.0V for the positive electrode 20, 20', depending on the exact chemical make-up of the electrodes) drives the electrons produced by the oxidation of inserted lithium at the lithiated negative electrode through the external circuit 26 towards the positive electrode 20, 20'. The lithium ions 28 are concurrently carried by the electrolyte 30 through the microporous polymer separators 18A, 18B towards the positive electrode 20, 20'. The electrons flowing through the external circuit 26 and the lithium ions 28 migrating across the microporous polymer separators 18A, 18B in the electrolyte 30 eventually incorporate, in some form, lithium at the positive electrode 20, 20', thereby lithiating the positive electrode 20, 20'.

In another example, pre-lithiating the positive electrode 20, 20' by applying the voltage potential between the lithium source electrode 16 and the positive electrode 20, 20' (and not the non-lithium negative electrode 12) renders the electrochemical cell 10 in a discharged state. An external battery charger may be connected to the lithiated positive electrode and the non-lithium negative electrode 12, to drive the reverse of battery discharge electrochemical reactions to charge the electrochemical cell 10. During charging, the electrons flow towards the non-lithium negative electrode 12 through the external circuit 26, and the lithium ions 28 are carried by the electrolyte 30 across the porous separators 18A and/or 18B towards the non-lithium negative electrode 12. The electrons and the lithium ions 28 unite at the non-lithium negative electrode 12, eventually incorporating, in some form, lithium at the non-lithium negative electrode 12, thereby lithiating the non-lithium negative electrode 12.

In yet another example, the non-lithium negative electrode 12 and the positive electrode 20, 20' may each be partially pre-lithiated to render the electrochemical cell 10 in a partial charged/discharged state. For partial pre-lithiation, the voltage potential may be applied between the lithium source electrode 16 and the non-lithium negative 12 and between the lithium source electrode 16 and the positive electrode 12, 20, 20' at different times until the electrode 12 or 20, 20' is partially pre-lithiated. For example, a voltage potential may be applied between the non-lithium negative electrode 12 and the lithium source electrode 16 to partially pre-lithiate the negative electrode 12. Then, a voltage potential may be applied between the positive electrode 20, 20' and the lithium source electrode 16 to partially pre-lithiate the positive electrode 20, 20'. It is to be understood that the combined amount of lithium added to both electrodes 12, 20, 20' does not exceed 110% of the capacity of the respective electrodes 12, 20, 20'. The electrochemical cell 10 may then be discharged or charged as previously described above to fully lithiate either the partially lithiated negative electrode (i.e., by charging the cell 10) or to fully lithiate the partially lithiated positive electrode 20, 20' (i.e., by discharging the cell 10).

Figure 2:
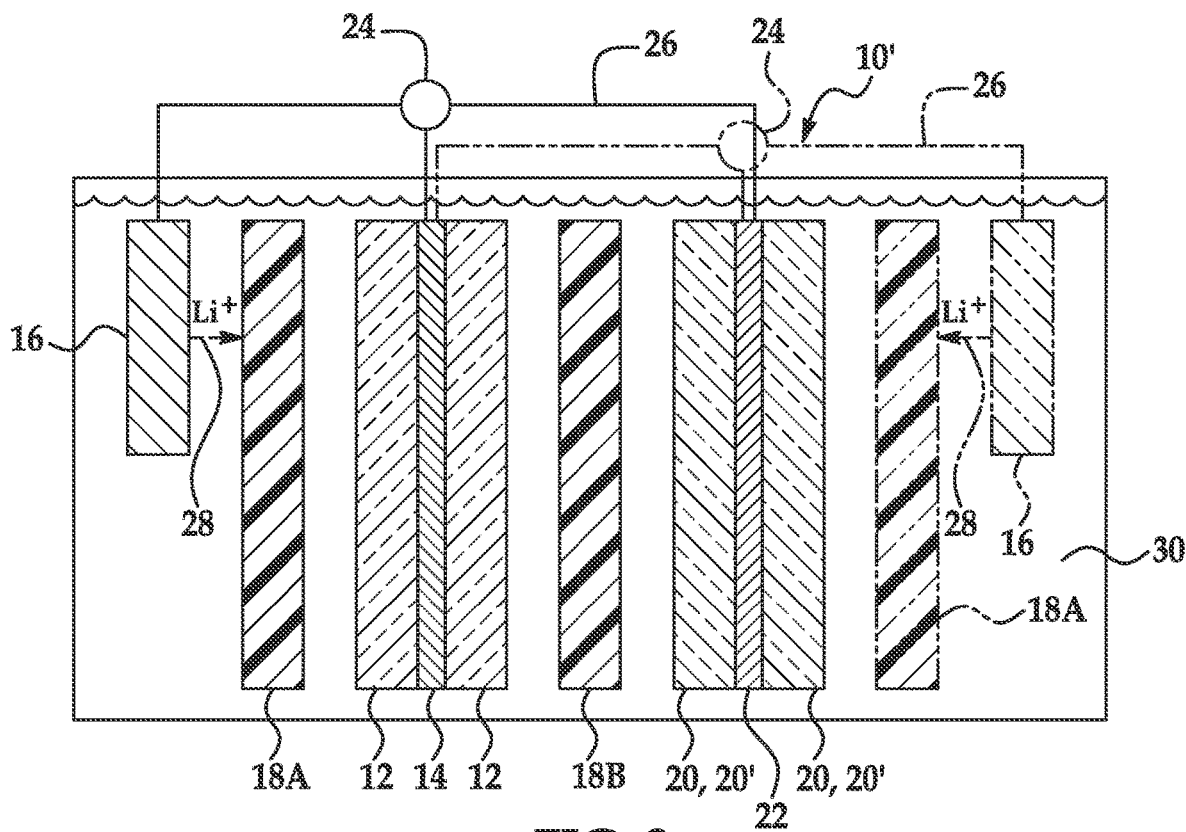
FIG. 2 is a cross-sectional view of another example of the electrochemical cell disclosed herein.

Turning to FIG. 2, in another example of the method disclosed herein, the electrochemical cell 10' may be formed. It is to be understood that the same materials as disclosed herein for the electrochemical cell 10 shown in FIG. 1 may be used to form the components of the electrochemical cell 10'.

In this example, the electrochemical cell 10' includes the non-lithium negative electrode 12 in contact with the lithium ion permeable negative electrode current collector 14. The electrochemical cell 10' also includes the positive electrode 20, 20' in contact with the lithium ion permeable positive electrode current collector 22. One of the microporous polymer separators 18B may be disposed between the non-lithium negative and positive electrodes 12, 20, 20'.

The electrochemical cell 10' further includes the lithium source electrode 16. In this example cell 10', the lithium source electrode 16 is not positioned between the non-lithium negative and positive electrodes 12, 20, 20', but rather is positioned at an end of the cell 10. In this example, another microporous polymer separator 18A is disposed between the lithium source electrode 16 and the non-lithium negative electrode 12. It is to be understood that the placement of the lithium source electrode 16 is not limited to the configuration shown in FIG. 2. In some instances, as shown in phantom in FIG. 2, the lithium source electrode 16 may be adjacent to the outermost positive electrode 20, 20' rather than the outermost non-lithium negative electrode 12.

The electrochemical cell 10' also includes an external circuit 26 and a load 24 as previously described in reference to FIG. 1. In this electrochemical cell 10', the non-lithium electrodes 12, 20, 20' may be pre-lithiated by applying a voltage potential between the lithium source electrode 16 and the non-lithium negative electrode 12 or the positive electrode 20, 20'. In one example, the voltage is applied between the lithium source electrode 16 and the non-lithium negative electrode 12. In this example, the applied voltage potential may cause the lithium ions 28 to move towards the non-lithium negative electrode 12 (shown by the "Li$^+$→"). In the configuration shown in FIG. 2, the pre-lithiation of the non-lithium negative 12 occurs in a similar manner as described in FIG. 1. Unlike FIG. 1, however, the lithium ions 28 are directed towards the non-lithium negative electrode 12 through the opposite side of the electrode 12. Since the separator 18A and the current collector 14 are lithium ion permeable, the non-lithium negative electrode 12 can be pre-lithiated with lithium ions 28 supplied by the lithium source electrode 16, which may be positioned on either side of the the non-lithium negative electrode 12.

In another example, since the components 18A, 14, 12 and 18B are lithium ion permeable, the positive electrode 20, 20' may be pre-lithiated in situ. For example, the voltage potential (with a constant current) may be applied between the lithium source electrode 16 and the positive electrode 20, 20'. In the configuration shown in FIG. 2, the pre-lithiation of the positive electrode 20, 20' occurs in a similar manner as described in FIG. 1. If the lithium source electrode 16 at the far left hand side of the cell 10' is used, the lithium will travel through the negative electrode 12 and current collector 14 since the voltage is applied between the source electrode 16 and the positive electrode 20, 20'. As mentioned above, in some instances (shown in phantom in FIG. 2), the lithium source electrode 16 may be adjacent to the outermost positive electrode 20, 20' rather than the outermost non-lithium negative electrode 12. In this example, the separator 18A may be positioned between the current collector 22/positive electrode 20, 20' and the lithium source electrode 16. In this example, the voltage potential may be applied across the lithium source electrode 16 (on the right hand side of the cell 10') and the positive electrode 20, 20' to pre-lithiate the positive electrode 20, 20'. Since the separator 18A and the current collector 22 are lithium ion permeable, the positive electrode 20, 20' can be pre-lithiated with lithium ions 28 supplied by the lithium source electrode 16, which (in this example) is positioned closer to the positive electrode 20, 20'.

The configuration shown in phantom allows the lithium ions 28 to lithiate the non-lithium negative electrode 12 when a voltage potential is applied between the lithium source electrode 16 and the non-lithium negative electrode 12. In this example, lithium ions 28 continue to move from the lithium source electrode 16, through the positive electrode 20, 20', to the non-lithium negative electrode 12 when the voltage potential is being applied between electrodes 12 and 16 (positioned on the far right). In these instances, the amount of lithium introduced may be controlled by using constant current and time with varied potential, and is determined by the capacity of the non-lithium negative electrode 12 (as previously described herein in reference to FIG. 1).

In another example, in either configuration shown in FIG. 2, the electrodes 12, 20, 20' may each be partially pre-lithiated as previously described in reference to FIG. 1.

Figure 3:
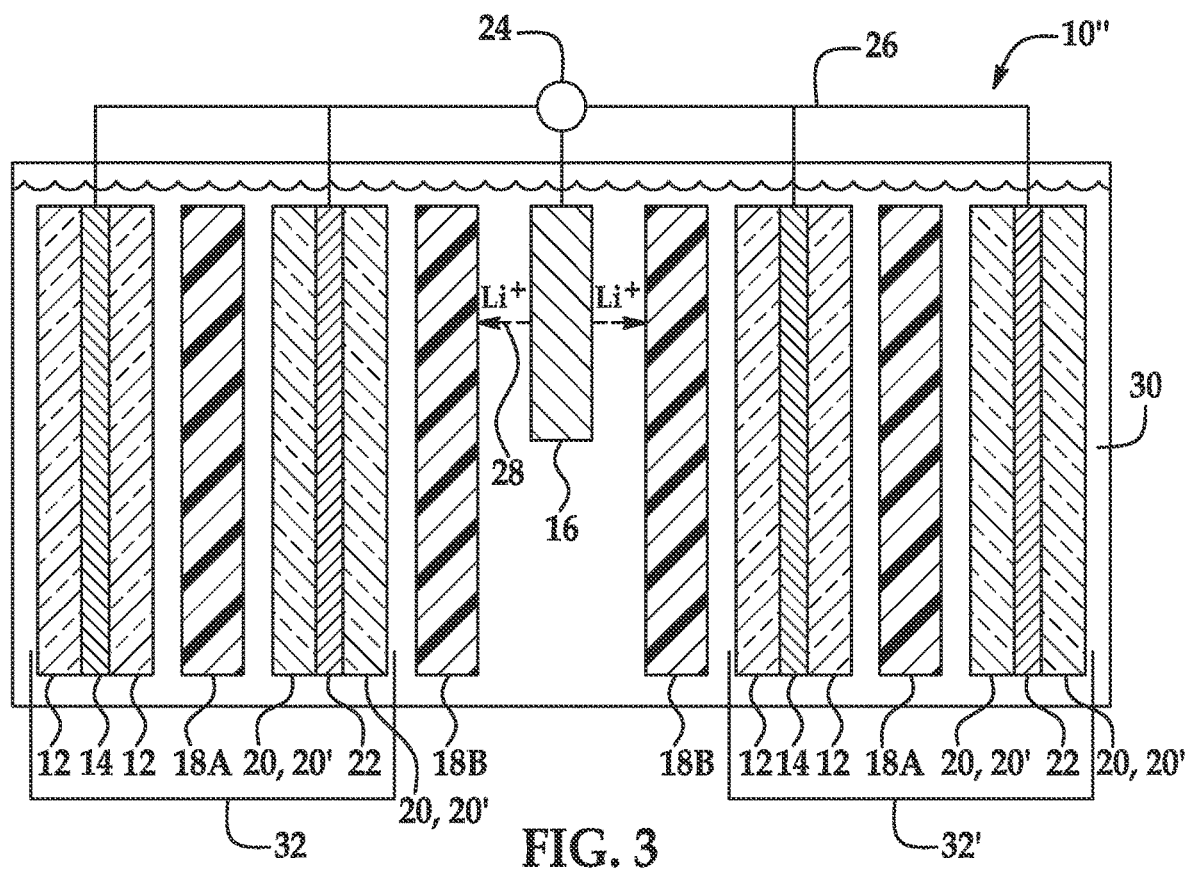
FIG. 3 is a cross-sectional view of an example of the electrochemical cell disclosed herein including two sub-cells within the electrochemical cell.

Referring now to FIG. 3, in yet another example of the method disclosed herein, the electrochemical cell 10" may be formed. It is to be understood that the same materials as disclosed herein for the electrochemical cell 10 in FIG. 1 may be used to form the components of the electrochemical cell 10".

In this example, the electrochemical cell 10" includes two sub-cells 32, 32'. Each sub-cell 32, 32' includes the non-lithium negative electrode 12 disposed in contact with the lithium ion permeable negative electrode current collector 14. Each sub-cell 32, 32' also includes the positive electrode 20, 20' disposed in contact with a lithium ion permeable positive electrode current collector 22. The microporous polymer separator 18A may be disposed between the non-lithium negative electrode 12 and positive electrode 20, 20' within each sub-cell 32, 32'.

The electrochemical cell 10″ shown in FIG. 3 further includes the lithium source electrode 16 with microporous polymer separators 18B disposed between the lithium source electrode 16 and each of the two sub-cells 32, 32′. It is to be understood that additional sub-cells 32, 32′ may be included in the electrochemical cell 10″ (e.g., three or more sub-cells). The additional sub-cells 32, 32′ may be positioned at the outermost portion of the electrochemical cell 10″ adjacent to either the sub-cell 32, sub-cell 32′, or both sub-cells 32, 32′.

It is to be understood that the placement of the non-lithium negative electrode 12 and the positive electrode 20, 20′ within the sub-cells 32, 32′ is not limited to the example shown in FIG. 3. For example, the sub-cell 32′ may have the positive electrode 20, 20′ positioned adjacent to the lithium source electrode 16. In another example, the sub-cell 32 may have the non-lithium negative electrode 12 positioned adjacent to the lithium source electrode 16.

In addition, the number of microporous polymer separators 18B present in the cell 10″ depends upon the number of sub-cells 32, 32′ that are included in the electrochemical cell 10″. For example, when the electrochemical cell 10″ has more than two sub-cells 32, 32′, there may be at least one microporous polymer separator 18B positioned between each sub-cell to separate the sub-cells from each other. In an example, if the electrochemical cell 10″ has a third sub-cell (not shown in FIG. 3) at the outermost portion of the electrochemical cell 10″ adjacent to sub-cell 32′, a microporous polymer separator 18B may be positioned between sub-cell 32′ and the third sub-cell.

The electrochemical cell 10″ also includes an external circuit 26 and a load 24 as previously described in reference to FIG. 1.

To pre-lithiate one of the sub-cells 32, the voltage potential (and constant current) may be applied (e.g., for a sufficient amount of time or until a cut-off voltage is reached) between the lithium source electrode 16 and the positive electrode 20, 20′ (of the sub-cell 32) or the non-lithium negative electrode 12 (of the sub-cell 32). In another example, each of the electrodes 12, 20, 20′ of the sub-cell 32 may be partially pre-lithiated separately. In this example, the electrode 20, 20′ or the electrode 12 of the sub-cell 32 becomes pre-lithiated as described in reference to FIG. 2 when the positive electrode 20, 20′ is adjacent to the lithium source electrode 16 (as shown in phantom in FIG. 2).

To pre-lithiate the other of the sub-cells 32′, the voltage potential (and constant current) may be applied (e.g., for a sufficient amount of time or until a cut-off voltage is reached) between the lithium source electrode 16 and the non-lithium negative electrode 12 (of the sub-cell 32′), or the positive electrode 20, 20′ (of the sub-cell 32′). In another example, each of the electrodes 12, 20, 20′ of the sub-cell 32′ may be partially pre-lithiated separately (i.e., one electrode 12 or 20, 20′ at a time). In this example, the electrode 12 or the electrode 20, 20′ of the sub-cell 32′ becomes pre-lithiated as described in reference to FIG. 2 when the non-lithium negative electrode 12 is adjacent to the lithium source electrode 16.

Figure 4:
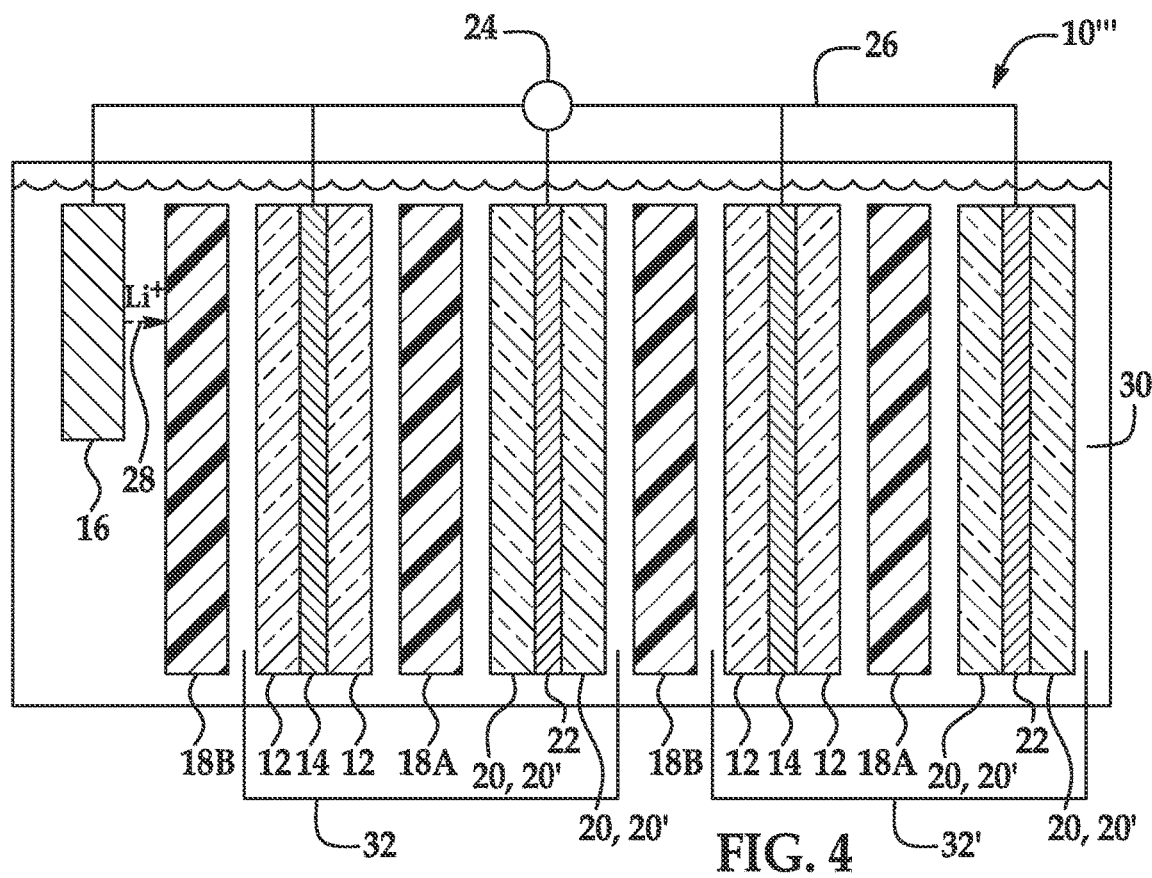
FIG. 4 is a cross-sectional view of another example of the electrochemical cell disclosed herein including two sub-cells within the electrochemical cell.

Still further, in yet another example, the electrochemical cell 10‴ may be formed. An example of the electrochemical cell 10‴ is shown in FIG. 4. It is to be understood that the same materials as disclosed herein for the electrochemical cell 10 in FIG. 1 may be used to form the components of the electrochemical cell 10‴.

In this example, the electrochemical cell 10‴ includes two sub-cells 32, 32′. Each sub-cell 32, 32′ includes the same components as described herein for FIG. 3. Similar to FIG. 3, the sub-cells 32, 32′ are separated by the separator 18B.

Unlike the example shown in FIG. 3, the lithium source electrode 16 of the electrochemical cell 10‴ shown in FIG. 4 is positioned at one end of the cell 10‴. As shown in FIG. 4, the microporous polymer separator 18B is disposed between the lithium source electrode 16 and the sub-cell 32. The electrochemical cell 10‴ is not limited to the configuration shown in FIG. 4. The lithium source electrode 16 may alternatively be in the outermost portion of the electrochemical cell 10‴ adjacent to the sub-cell 32′. Furthermore, it is to be understood that additional sub-cells may be included in the electrochemical cell 10‴ (e.g., three or more sub-cells). The additional sub-cells may be positioned adjacent to either the sub-cell 32, sub-cell 32′, or both sub-cells 32, 32′.

It is to be understood that the placement of the non-lithium negative electrode 12 and the positive electrode 20, 20′ within the sub-cells 32, 32′ is not limited to the example shown in FIG. 4. For example, the sub-cell 32′ may have the positive electrode 20, 20′ positioned adjacent to the microporous polymer separator 18B separating the two sub-cells 32, 32′. In another example, the sub-cell 32 may have the non-lithium negative electrode 12 positioned adjacent to the microporous polymer separator 18B separating the two sub-cells 32, 32′.

In addition, the number of microporous polymer separators 18B depends upon the number of sub-cells 32, 32′ in the electrochemical cell 10‴. For example, when the electrochemical cell 10‴ has more than two sub-cells 32, 32′, there may be at least one microporous polymer separator 18B positioned between each sub-cell that separates the additional sub-cells from each other. In an example, if the electrochemical cell 10‴ has a third sub-cell (not shown in FIG. 4) in the outermost portion of the electrochemical cell 10‴ adjacent to sub-cell 32′, an additional microporous polymer separator 18B may be positioned between sub-cell 32′ and the third sub-cell.

The electrochemical cell 10‴ also includes an external circuit 26 and a load 24 as previously described in reference to FIG. 1. The electrodes 12, 20, 20′ of the various sub-cells 32, 32 may be pre-lithiated as previously described in reference to FIG. 2. In particular, the voltage potential may be applied between the lithium source electrode 16 and the electrode within the sub-cells 32, 32′ that is being pre-lithiated (e.g., between the lithium source electrode 16 and the non-lithium negative electrode 12 of sub-cell 32 or 32′).

In the sub-cell 32, the voltage potential may be applied, using a constant current, between the lithium reference electrode 16 and the non-lithium negative electrode 12, or the positive electrode 20, 20′. The voltage potential may be applied for a sufficient amount of time to lithiate the desired electrode 12, 20, 20′. The electrodes 12 and 20, 20′ of the sub-cell 32 may also be partially lithiated as previously described.

In sub-cell 32′, the voltage potential may be applied, using a constant current, between the lithium reference electrode 16 and the non-lithium negative electrode 12 of the sub-cell 32′. The voltage may be applied long enough for the lithium ions 28 to migrate through the sub-cell 32 to the non-lithium negative electrode 12 of sub-cell 32′. Once the lithium ions 28 reach the non-lithium negative electrode 12 of sub-cell 32′ the non-lithium negative electrode 12 of sub-cell 32′ becomes lithiated. A voltage potential may also be applied, using a constant current, between the lithium reference electrode 16 and the positive electrode 20, 20′ of sub-cell 32′ to lithiate the positive electrode 20, 20′ of the sub-cell 32′.

The electrodes 12 and 20, 20' of the sub-cell 32' may also be partially lithiated as previously described.

If the non-lithium negative electrode 12 of sub-cell 32' is pre-lithiated, the positive electrode 20, 20' of sub-cell 32' may become lithiated (with lithium leaving the negative electrode 12) during the first discharge cycle of the electrochemical cell 10'''. If the positive electrode 20, 20' of sub-cell 32' is pre-lithiated, the non-lithium negative electrode 12 may become lithiated (with lithium leaving the positive electrode 20, 20') during the first charge cycle of the electrochemical cell 10'''. If each electrode 12, 20, 20' is partially pre-lithiated, the electrochemical cell 10''' may be charged or discharged and cycled to complete lithiation of one electrode 12 or 20, 20' as previously described in reference to FIG. 1.

The pre-lithiation of the electrode(s) 12, 20, 20' of the electrochemical cell 10, 10', 10'', 10''' may take place in-situ (i.e., in the full cell, which may then be used as the battery). In an example, the electrochemical cell 10, 10', 10'', 10''' that is formed may be a pouch cell, coin cell, or another full electrochemical cell having a cylindrical format or wounded prismatic format.

In the prismatic format, the electrodes and current collectors form a stacked geometric structure that may be sealed with a packaging material capable of preventing air and water contamination of the cell 10, 10', 10'', 10'''. Three terminals may be employed to allow electrical access to the battery-terminals for each of the positive electrode, the negative electrode, and the lithium source electrode 16. In the cylindrical format, the multi-layered structure may be wound into a configuration similar to a jelly roll. The lithium source electrode 16 layer may be placed as the outmost layer, or another layer. The wound structure may be sealed in a metal container after the electrolyte 30 is added. This cell will also have three leads.

It is to be understood that the pouch cell or other full electrochemical cell 10, 10', 10'', 10''' is not opened after pre-lithiation, but rather may be used as a lithium ion or lithium sulfur battery (e.g., a silicon sulfur battery).

When the electrochemical cell 10, 10', 10'', 10''' is a lithium-based battery, the load device 24 may be any number of known electrically-powered devices, a few specific examples of a power-consuming load device 24 include an electric motor for a hybrid vehicle or an all-electrical vehicle, a laptop computer, a cellular phone, and a cordless power tool. The load device 24 may also, however, be an electrical power-generating apparatus that charges the lithium-based battery for purposes of storing energy. For instance, the tendency of windmills and solar panels to variably and/or intermittently generate electricity often results in a need to store surplus energy for later use.

The lithium-based battery may also include a wide range of other components that are known to skilled artisans. For instance, the lithium-based battery may include a casing, gaskets, terminals, tabs, and any other desirable components or materials that may be situated between or around the negative electrode and the positive electrode for performance-related or other practical purposes. Moreover, the size and shape of the lithium-based battery, as well as the design and chemical make-up of its main components, may vary depending on the particular application for which it is designed. Battery-powered automobiles and hand-held consumer electronic devices, for example, are two instances where the lithium-based battery would most likely be designed to different size, capacity, and power-output specifications. The lithium-based battery may also be connected in series and/or in parallel with other similar lithium-based batteries to produce a greater voltage output and current (if arranged in parallel) or voltage (if arranged in series) if the load device 24 so requires.

Specifically for a lithium ion battery, the lithium ion battery generally operates by reversibly passing lithium ions between the lithiated negative electrode and the lithiated positive electrode. In the fully charged state, the voltage of the battery is at a maximum (typically in the range 1.5V to 5.0V); while in the fully discharged state, the voltage of the battery is at a minimum (typically in the range 0V to 1.5V). Essentially, the Fermi energy levels of the active materials in the lithiated positive and negative electrodes change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 24 enables an electronic current flow in the external circuit 26 with a direction such that the difference between the Fermi levels (and, correspondingly, the cell voltage) decreases. The reverse happens during battery charging: the battery charger forces an electronic current flow in the external circuit 26 with a direction such that the difference between the Fermi levels (and, correspondingly, the cell voltage) increases.

At the beginning of a discharge, in instances where the non-lithium negative electrode 12 has been pre-lithiated, the lithiated negative electrode of the lithium ion battery contains a high concentration of intercalated lithium while the positive electrode 20 is relatively depleted. When the lithiated negative electrode contains a sufficiently higher relative quantity of intercalated lithium, the lithium ion battery can generate a beneficial electric current by way of reversible electrochemical reactions that occur when the external circuit 26 is closed to connect the lithiated negative electrode and the positive electrode 20. The establishment of the closed external circuit under such circumstances causes the extraction of intercalated lithium from the lithiated negative electrode. The extracted lithium atoms are split into lithium ions 28 and electrons as they leave an intercalation host at the negative electrode-electrolyte interface.

The chemical potential difference between the positive electrode 20 and the lithiated negative electrode (ranging from about 1.5V to about 5.0V, depending on the exact chemical make-up of the lithiated electrodes) drives the electrons produced by the oxidation of intercalated lithium at the lithiated negative electrode through the external circuit 26 towards the positive electrode 20. The lithium ions 28 are concurrently carried by the electrolyte 30 through the microporous polymer separators 18 towards the positive electrode 20. The electrons flowing through the external circuit 26 and the lithium ions 28 migrating across the microporous polymer separators 18A and/or 18B in the electrolyte 30 eventually reconcile and form intercalated lithium to lithiate the positive electrode 20. The electric current passing through the external circuit 26 can be harnessed and directed through the load device 24 until the level of intercalated lithium in the lithiated negative electrode falls below a workable level or the need for electrical energy ceases.

The lithium ion battery may be recharged after a partial or full discharge of its available capacity. To charge the lithium ion battery an external battery charger is connected to the lithiated positive and the lithiated negative electrodes, to drive the reverse of battery discharge electrochemical reactions. During recharging, the electrons flow back towards the lithiated negative electrode (whose lithium concentration has been at least partially depleted) through the external circuit 26, and the lithium ions 28 are carried by the electrolyte 30 across the porous separators 18A and/or 18B back towards the lithiated negative electrode. The electrons and the lithium ions 28 are reunited at the lithiated negative electrode, thus replenishing it with intercalated lithium for consumption during the next battery discharge cycle.

The external battery charger that may be used to charge the lithium ion battery, may vary depending on the size, construction, and particular end-use of the lithium ion battery. Some suitable external battery chargers include a battery charger plugged into an AC wall outlet and a motor vehicle alternator.

The lithium sulfur battery can also generate a useful electric current during battery discharge. In instances where the non-lithium negative electrode 12 has been pre-lithiated, during discharge, the chemical processes in the lithium sulfur battery include lithium ($Li^+$) dissolution from the surface of the lithiated negative electrode and incorporation of the lithium ions 28 into alkali metal polysulfide salts (e.g., $Li_2S_x$, such as $Li_2S_8$, $Li_2S_6$, $Li_2S_4$, $Li_2S_3$, $Li_2S_2$, and $Li_2S$) in the positive electrode 20'. As such, polysulfides are formed (sulfur is reduced) on the surface of the positive electrode 20' as lithium ions 28 lithiate the positive electrode 20' in sequence while the battery is discharging. The chemical potential difference between the positive electrode 20' and the lithiated negative electrode (ranging from approximately 1.5V to 3.0V, depending on the exact chemical make-up of the electrodes) drives electrons produced by the dissolution of lithium at the lithiated negative electrode through the external circuit 26 towards the positive electrode 20'. The resulting electric current passing through the external circuit 26 can be harnessed and directed through the load device 24 until the lithium in the lithiated negative electrode is depleted and the capacity of the lithium sulfur battery is diminished, or until the level of lithium in the lithiated negative electrode falls below a workable level, or until the need for electrical energy ceases.

The lithium sulfur battery can be charged or re-powered at any time by applying an external power source to the lithium sulfur battery to reverse the electrochemical reactions that occur during battery discharge. During charging, lithium plating to the lithiated negative electrode takes place, and sulfur formation at the lithiated positive electrode takes place. The connection of an external power source to the lithium sulfur battery compels the otherwise non-spontaneous oxidation of lithium at the lithiated positive electrode to produce electrons and lithium ions 28. The electrons, which flow back towards the lithiated negative electrode through the external circuit 26, and the lithium ions 28, which are carried by the electrolyte 30 across the microporous polymer separators 18 back towards the lithiated negative electrode, reunite at the lithiated negative electrode and replenish it with lithium for consumption during the next battery discharge cycle. The external power source that may be used to charge the lithium sulfur battery may vary depending on the size, construction, and particular end-use of the lithium sulfur battery. Some suitable external power sources include a battery charger plugged into an AC wall outlet and a motor vehicle alternator.

The method disclosed herein may further include relithiating the lithium ion or lithium sulfur battery when the mass of lithium ions 28 in the lithium source electrode 16 is added slightly in excess (of an amount suitable for pre-lithiation). The relithiation may occur after the lithium ion or lithium sulfur battery has cycled through at least some charging and discharging cycles. The number of cycles performed prior to relithiating may vary depending on the type and/or size of battery. During cycling, the lithium becomes irreversibly lost. To compensate for this irreversible loss, a suitable voltage with a controlled current may be applied across suitable electrodes (e.g., 16 and 12, 16 and 20, 20') to initiate relithiation. During relithiation, the excess mass of lithium ions 28 from the lithium source electrode 16 may relithiate the electrode(s) of the lithium ion or lithium sulfur battery.

In the examples disclosed herein, it may be desirable to deplete one of the electrodes 12 or 20, 20' of lithium prior to battery cycling. In these examples, the opposite current (of that used to pre-lithiate) may be used with an appropriate voltage to drive lithium from the electrode 12 or 20, 20' to the lithium source electrode 16.

In the examples disclosed herein, after the lithium source electrode 16 is used to pre-lithiate the electrode(s) 12, 20, 20', the lithium source electrode 16 may remain in the battery and be used as a reference electrode during battery operation. When soaked in a suitable electrolyte 30, the structure of FIG. 2 (and specifically the example shown in phantom) enables direct ion communication between the lithium source electrode 16 and the lithiated positive electrode and the lithiated negative electrode without blocking the current pathways of the battery. During normal battery operation, current is flowing between the lithiated positive electrode and the lithiated negative electrode. During battery operation, the application of a very small current between the lithiated positive electrode and the lithium source electrode 16 enables voltage monitoring of the lithiated positive electrode. Also during battery operation, the application of a very small current between the lithiated negative electrode and the lithium source electrode 16 enables voltage monitoring of the lithiated negative electrode.

As used herein, the "very small current" is a reference current applied between the lithium source electrode 16 and the lithiated positive or negative electrode in order to monitor the individual electrode voltages, and to determine the battery voltage. In an example, the very small current is less than about $10^{-6}$ amp (i.e., microamp), such as about $5 \times 10^{-7}$ amp, $10^{-7}$ amp, $5 \times 10^{-8}$ amp, $10^{-8}$ amp, or less. In some examples, the very small or reference current is in the nanoamp (nA) range, such as about $9 \times 10^{-9}$ amp, $8 \times 10^{-9}$ amp, $7 \times 10^{-9}$ amp, $6 \times 10^{-9}$ amp, $5 \times 10^{-9}$ amp, $4 \times 10^{-9}$ amp, $3 \times 10^{-9}$ amp, $2 \times 10^{-9}$ amp, $10^{-9}$ amp, or less than $10^{-9}$ amp. In an example, the reference current ranges from about 0.5 nA to about 2 nA, such as about 1 nA. The principles and scope of the examples disclosed herein work for reference currents higher than $10^{-6}$ amp, but such relatively high currents (compared to the current output of the battery) are not necessary for accurate voltage readings.

With reference to FIG. 2, during operation of the cell 10' (i.e., post pre-lithiation), the voltage between current collectors 14 and 22 is a normal battery voltage. The voltage between a current collector (not shown) adjacent to the lithium source electrode 16 and the current collector 14, when the reference current is applied, is the negative electrode voltage (i.e., anode voltage). The voltage between the current collector adjacent to the lithium source electrode 16 and the current collector 22, when the reference current is applied, is the positive electrode voltage (i.e., cathode voltage).

Subtraction of the cathode voltage from the anode voltage gives the monitored battery voltage. Because the actual battery voltage will generally be known in the circuit between current collectors 14 and 22, an indication of accuracy can be provided by comparing the actual battery voltage with the monitored battery voltage.

The cathode and anode voltages may be dynamically monitored simultaneously, if desired. Alternatively, an electrode voltage may be monitored for some period of time, followed by monitoring of another electrode present in the battery. The cathode and/or anode voltage may be monitored continuously, periodically, randomly, or on a prescribed schedule with respect to battery operation. The cathode and anode voltages may be displayed using one or more digital multimeters (or similar devices), and recorded on a computer for processing.

The battery structure disclosed herein may further include an external reference circuit between the current collector of the lithium source electrode 16 and the current collector 14, wherein the external reference circuit is electrically connected to a monitor to display or record voltage of the negative electrode. Still further, the battery structure may include an external reference circuit between the current collector of the lithium source electrode 16 and the current collector 22, wherein the external reference circuit is electrically connected to the monitor to display or record voltage of the positive electrode.

As an example of the method for monitoring the electrode potential of the battery, the cell 10', 10''' is provided or obtained, which includes at least a first electrode (e.g., lithiated negative electrode), a second electrode (e.g., lithiated positive electrode), and the lithium source electrode 16 that is not spatially between the first and second electrode. The battery is operated between the first and second electrodes to produce or receive power. To monitor the voltage of the first electrode, a first reference current is applied in a first external reference circuit between the lithium source electrode 16 and the first electrode, and the voltage of the first electrode is displayed or recorded. To monitor the voltage of the second electrode, a second reference current is applied in a second external reference circuit between the lithium source electrode 16 and the second electrode, and the voltage of the second electrode is displayed or recorded.

The monitoring of the voltages of the respective electrodes may be conducted at different times, if desired. In this example, the first external reference circuit may be repositioned and used as the second external reference circuit. Alternatively, two physically distinct external reference circuits may be utilized.

The monitoring of the voltages of the respective electrodes may also be conducted simultaneously. In this example, physically distinct external reference circuits are utilized.

To further illustrate the present disclosure, an example is given herein. It is to be understood that this example is provided for illustrative purposes and is not to be construed as limiting the scope of the disclosure.

EXAMPLE

Pouch Cell Fabrication

Figure 5:
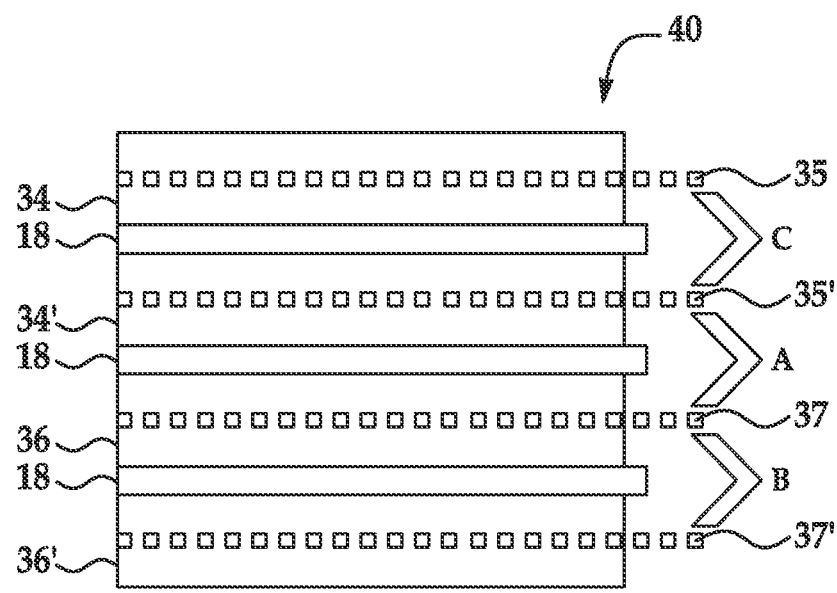
FIG. 5 is a schematic illustration of the structure of an electrochemical test cell that includes lithiated positive and negative electrodes.

FIG. 5 depicts a schematic view of an electrochemical test cell 40 that was formed for use in this example. The electrochemical test cell 40 was a pouch cell that included two negative electrodes 34, 34' and two positive electrodes 36, 36' soaked in a low temperature electrolyte.

Electrode Preparation

To fabricate the electrodes 34, 34', 36, 36', standalone electrode tapes were cast using a doctor-blade technique, and then two standalone electrode tapes were laminated onto opposed sides of a current collector 35, 35', 37, 37'.

The standalone negative electrode tapes used to form the negative electrodes 34, 34' were composed of 80 wt. % $Li_{4+3z}Ti_5O_{12}$ (LTO, $0<z<1$) (commercially available from Hanwha Chemical Co.) as the negative active material, 5 wt. % Super P® carbon as a conductive filler (commercially available from TIMCAL), 5 wt. % TIMREX® KS6 as another conductive filler (commercially available from TIMCAL), and 10 wt % KF POLYMER® 1100 as the polymer binder (commercially available from Kureha Corporation). As mentioned herein, each standalone negative electrode tape was cast using a doctor-blade technique.

The standalone positive electrode tapes used to form the positive electrodes 36, 36' were composed of 84 wt. % $Li_{x+y}Mn_{2-y}O_4$ (LMO, $0<x<1$ and $0<y<0.1$) (commercially available from Toda Kogyo Corp.) as the positive active material, 3 wt. % Super P® carbon as a conductive filler (commercially available from TIMCAL), 3 wt. % TIMREX® KS6 as another conductive filler (commercially available from TIMCAL), and 10 wt % KYNAR® 2801 PVDF as the polymer binder (commercially available from Arkema Inc.).

Prior to cell 40 fabrication, each positive electrode 36, 36' was prepared by laminating two standalone LMO tapes onto an aluminum mesh current collector 37, 37'. Similarly, each negative electrode 34, 34' was prepared by laminating two standalone LTO tapes onto a copper mesh current collector 35, 35'. Each electrode 34, 34', 36, 36' was then cut to 2×3 cm² projected area. Active material loading of the positive electrodes 36, 36' and the negative electrodes 34, 34' was 219 mg and 148 mg, respectively.

The electrodes 36' and 36, 36 and 34', and 34' and 34 were separated by respective polypropylene (PP) separators 18, available from Celgard.

Electrolyte Preparation

The low temperature electrolyte solvent used in the example electrochemical cell 40 was composed of 4:3:2:1 v/v propylene carbonate (PC), methyl butyrate (MB), ethyl methyl carbonate (EMC), and ethylene carbonate (EC) (all commercially available from Novolytes Technologies). The low temperature electrolyte salt was a mixture of 0.24M $LiPF_6$ and 0.96M $LiBF_4$ (both commercially available from Sigma Aldrich). The salt mixture was added to the solvent mixture to obtain the low temperature electrolyte.

The low temperature electrolyte was added to the pouch cell to complete the formation of the electrochemical cell 40. In this example electrochemical cell 40, the positive electrodes 36, 36' served as the lithium source electrode. Tests were performed to verify that the mesh current collectors would allow the transport of lithium ions across the electrodes.

Characterization Methods

All of the electrochemical experiments were carried out under ambient conditions in an environmental test chamber (e.g., a temperature of 20° C. and a pressure of 101.325 kPa). Galvanostatic studies were performed with an Arbin BT-2000 battery testing station. Respective cycling voltages (at constant current) were applied between the electrodes 34 and 34' (denoted C in FIG. 5), the electrodes 34' and 36 (denoted A in FIG. 5), and the electrodes 36 and 36' (denoted B in FIG. 5). The cycling voltage ranged from 2.7V to 1.5V between electrodes 34'/36 (A), from +0.6V to −0.6V between 36/36' (B), and from +0.5V to −0.5V between 34/34' (C). A 3-hr constant voltage hold procedure was added to the end of each constant current charge/discharge step. There results were shown in FIG. 6.

The AC impedance spectra or electrochemical impedance spectroscopy (EIS) were also acquired. Prior to EIS measurements, the amount of lithium in each electrode was rebalanced by discharging the electrodes 34, 34', 36, 36' to 0V at C/10 with a 3 hour voltage hold and 3 hour rest. The EIS results (shown in FIG. 7) were acquired with a Solartron Electrochemical Interface 1260 coupled with a Solartron frequency response analyzer 1255.

Results

The voltage cycling for each electrode was plotted vs. the amount of time (seconds) through the three cycles as described above. The galvanostatic charge/discharge curves for each pair, A (full cell 34'/36), B (symmetric cell 36/36'), C (symmetric cell 34/34'), are shown in FIG. 6 at A, B, and C, respectively.

Starting with electrode pair A, the initial charge capacity was 22.1 mAh (101 mAh/g LMO) and the reversible capacity was 19.6 mAh after 3 cycles at a C/10 rate with the voltage ranging from 1.5V to 2.7V. The cell was charged at the end of the $3^{rd}$ cycle indicating electrode 36 was in the fully delithiated state while the electrode 34' was lithiated. This allowed the electrode pair B (36/36') to cycle as a symmetric cell without over-lithiating the electrodes. The reversible capacity was 20.8 mAh (95 mAh/g LMO) at a C/10 rate with the voltage ranging from −0.6V to +0.6V. Similarly, starting with 19.6 mAh of lithium in electrode 34' transferred from electrode 36, electrode pair C (34/34') was cycled and obtained a reversible capacity of 16.0 mAh (108 mAh/g LTO) after 3 cycles with the voltage ranging from −0.5V to +0.5V.

Figure 6:
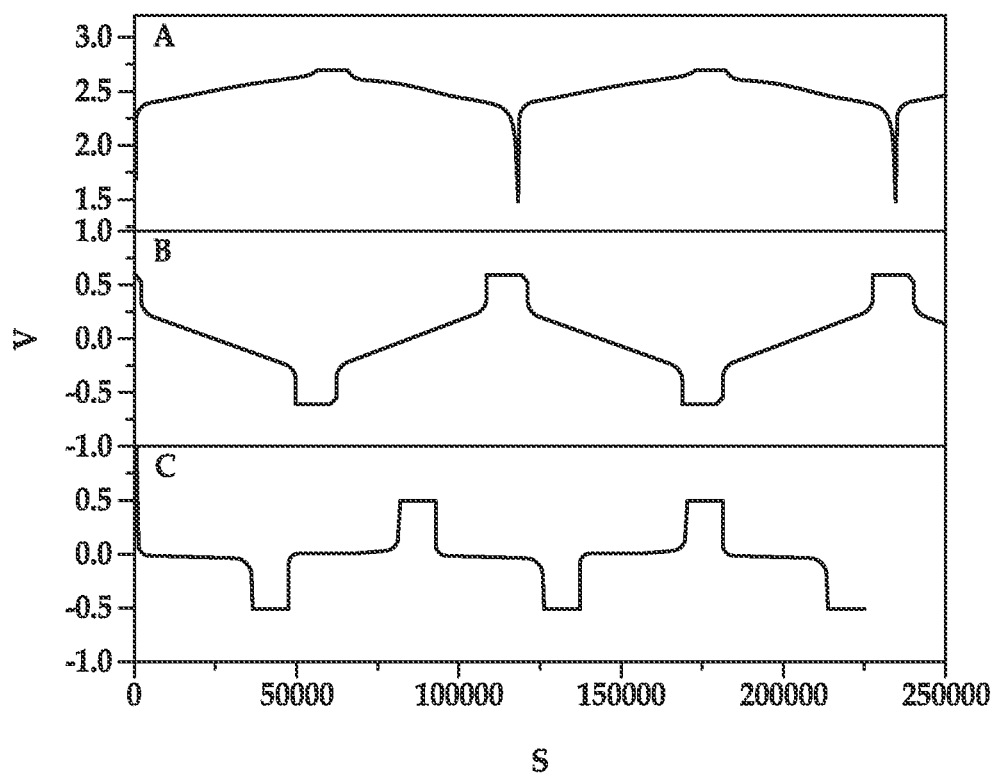
FIG. 6 includes three graphs respectively illustrating the difference in voltage over time for three different pairs of electrodes.

The results of the electrochemical cell cycling are shown in FIG. 6. FIG. 6 demonstrates that the electrodes are operational under different electrode configurations. Particularly, the results of FIG. 6 show that multiple sub-cells may be used within a single electrochemical cell and the single electrochemical cell is still operational since the lithium ions are able to migrate throughout the electrochemical cell.

The porous current collectors permit ions to pass through the electrodes 36, 36', 34, 34', and this enables new methods to quantify kinetics of individual components in a cell. As mentioned above, the electrochemical test cell 40 was cycled through charging and discharging while electrochemical impedance spectroscopy (EIS) measurements were taken. The EIS measured the impedance in Ohms (Ω) of each of the negative electrodes 34, 34' and the positive electrodes 36, 36' during charging and discharging.

Figure 7:
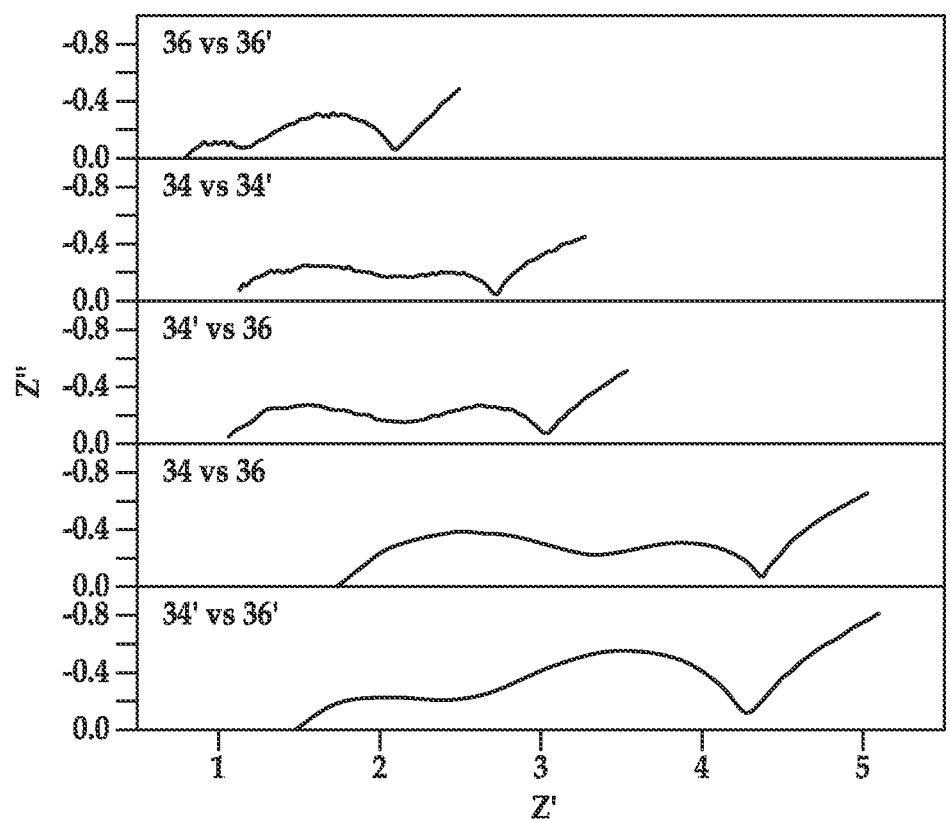
FIG. 7 includes five graphs respectively illustrating the impedance of one of the electrodes from the electrochemical test cell of FIG. 5 vs. the impedance of another one of the electrodes from the electrochemical test cell of FIG. 5.

FIG. 7 depicts the impedance (Ω) of one electrode (X axis labeled "Z"') vs. the impedance (Ω) of another electrode (Y axis labeled "Z''"). In the respective graphs of FIG. 7, the electrodes tested are shown as 36 vs 36', 34 vs 34', etc., and the impedance for the electrode listed first (e.g., 36, then 34, etc.) is along the X axis and the impedance for the electrode listed second (e.g., 36', 34', etc.) is along the Y axis. As illustrated in FIG. 7, the EIS results demonstrate that the lithium ions were able to migrate across the electrodes 34, 34', 36, 36' in the electrochemical test cell 40. The results in each of the various graphs of FIG. 7 illustrate that as the impedance of the electrode listed first increased, the impedance of the second listed electrode decreased (i.e., became more negative). These results illustrate that the lithium ions were able to migrate through the entire electrochemical test cell 40.

Specifically, the results illustrate that the lithium ions were able to migrate from the electrodes 36, 36' to electrodes 34, 34' through the current collectors that were present. It is believed this is due, at least in part, to the porous nature of the copper and aluminum current collectors on the negative and positive electrodes respectively. Since the lithium ions are able to move freely across the electrodes 34, 34', 36, 36' and their associated current collectors, a single lithium source may be used to lithiate multiple electrodes in one electrochemical cell. As such, in-situ pre-lithiation of electrodes is possible in a lithium ion or lithium sulfur battery using the lithium source electrode and the methods disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1.5V to about 5.0V should be interpreted to include not only the explicitly recited limits of from about 1.5V to about 5.0V, but also to include individual values, such as 2.0V, 3.5V, 4.3V, etc., and sub-ranges, such as from about 3.5V to about 4.5V; from about 1.8V to about 2.3V, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method, comprising:
   forming an electrochemical cell, including:
      at least one non-lithium negative electrode in contact with a lithium ion permeable negative electrode current collector, the at least one non-lithium negative electrode having a first side and an opposing second side, wherein the at least one non-lithium negative electrode is lithium ion permeable;
      at least one positive electrode in contact with a lithium ion permeable positive electrode current collector, the at least one positive electrode having a first side and an opposing second side, wherein the positive electrode is lithium ion permeable;
      a lithium source electrode including lithium ions in an amount ranging from about 10% to about 50% greater than the lithium ion capacity of the at least one non-lithium negative electrode or the at least one positive electrode, the lithium source electrode having a first side and an opposing second side and a projected area that is at least 20% of the area of the at least one non-lithium negative electrode or the at least one positive electrode; and
      one of:
      i) a first polymer separator disposed between the first side of the lithium source electrode and one of the at least one non-lithium negative electrode and a second polymer separator disposed between the second side of the lithium source electrode and one of the at least one positive electrode; or
      ii) a first microporous polymer separator disposed between the lithium source electrode and the first side of a first of the at least one non-lithium negative electrode, a second microporous polymer separator disposed between the second side of the first non-lithium negative electrode and a first side of a first of the at least one positive electrode, a third microporous polymer separator disposed between the second side of the first positive electrode and the first side of a second of the at least one non-lithium negative electrode, and a fourth microporous polymer separator disposed between the second side of the second non-lithium negative electrode and the first side of a second of the at least one positive electrode;

introducing an electrolyte into the electrochemical cell;

applying a voltage potential across the electrochemical cell, thereby pre-lithiating any of the non-lithium negative electrode and the positive electrode with lithium ions from the lithium source electrode, and forming a rechargeable lithium-based battery;

cycling the battery through discharge and charge cycles; and then, relithiating any of the non-lithium negative electrode and the positive electrode with lithium ions from the lithium source electrode.

2. The method as defined in claim 1 wherein:

the non-lithium negative electrode is pre-lithiated and the voltage potential ranges from about 0.005V to about 2.0V; or the positive electrode is pre-lithiated and the voltage potential ranges from about 1.5V to about 5.0V.

3. The method as defined in claim 1 wherein the electrochemical cell is selected from the group consisting of a pouch cell, a cylindrical cell, and a coin cell and is not opened after the pre-lithiating.

4. The method as defined in claim 1 wherein the at least one non-lithium negative electrode includes a negative active material, a binder, and a conductive filler, and wherein the negative active material is selected from the group consisting of graphite, amorphous carbon, silicon, a silicon alloy, silicon oxide, a silicon-carbon composite, tin oxide, and titanium oxide.

5. The method as defined in claim 1 wherein the at least one positive electrode includes a positive active material, a binder, and a conductive filler, and wherein:

the positive active material is a non-lithium containing active material selected from the group consisting of sulfur, vanadium oxide, manganese oxide, cobalt oxide, a manganese-nickel-oxide spinel, copper sulfide, iron sulfide, a layered nickel-manganese-cobalt oxide, and an iron polyanion oxide; or the at least one positive electrode includes a lithium containing positive active material selected from the group consisting of $LiMn_2O_4$, $Li(Ni_{0.5}Mn_{1.5})O_2$, $Li(Ni_{1/3}Mn_{1/3}Co_{1/3})O_4$, $LiCoO_2$, $LiNi_xM_{1-x}O_2$ (M is composed of any ratio of Al, Co, and Mg), $LiFePO_4$, $Li_2MSiO_4$ (M=Co, Fe, Mn), $xLi_2MnO_3 \cdot (1-x)LiMO_2$ (M is composed of any ratio of Ni, Mn and Co), $Li_{x+y}Mn_{2-y}O_4$ (0<x<1, 0<y<0.1), and a high efficiency lithium nickel-manganese-cobalt oxide material.

6. The method as defined in claim 1 wherein the lithium ion permeable negative electrode current collector is selected from the group consisting of a copper mesh, a nickel mesh, and a porous carbon paper, and the lithium ion permeable positive electrode current collector is selected from the group consisting of an aluminum mesh, a nickel mesh, and a porous carbon paper.

7. The method as defined in claim 1, further comprising controlling a mass of the lithium ions in the lithium source electrode, wherein the mass of the lithium ions in the lithium source electrode ranges from about 10% to about 50% greater than a mass of lithium used to pre-lithiate the any of the non-lithium negative electrode and the positive electrode with lithium ions.

8. The method as defined in claim 1 wherein the method forms a rechargeable lithium-based battery, and where the method further comprises using the lithium source electrode as a reference electrode in the battery to monitor electrode potential.

9. The method as defined in claim 1 wherein the relithiating is of the at least one non-lithium negative electrode, and the relithiating involves applying a relithiation voltage potential across the lithium source electrode and the at least one non-lithium negative electrode.

10. The method as defined in claim 1 wherein the relithiating is of the at least one positive electrode, and the relithiating involves applying a relithiation voltage potential across the lithium source electrode and the at least one positive electrode.

11. A method, comprising:

forming an electrochemical cell, including:

at least one non-lithium negative electrode in contact with a lithium ion permeable negative electrode current collector, the at least one non-lithium negative electrode having a first side and an opposing second side, wherein the at least one non-lithium negative electrode is lithium ion permeable;

at least one positive electrode in contact with a lithium ion permeable positive electrode current collector, the at least one positive electrode having a first side and an opposing second side, wherein the positive electrode is lithium ion permeable;

at least one lithium source electrode including lithium ions in an amount ranging from about 10% to about 50% greater than the lithium ion capacity of the at least one non-lithium negative electrode or the at least one positive electrode, the at least one lithium source electrode having a first side and an opposing second side and a projected area that is at least 20% of the area of the at least one non-lithium negative electrode or the at least one positive electrode; and one of:

i) a first polymer separator disposed between a first of the at least one lithium source electrode and the first side of the at least one non-lithium negative electrode, a second polymer separator disposed between the second side of the least one non-lithium negative electrode and the first side of the at least one positive electrode, and a third polymer separator disposed between the second side of the at least one positive electrode and a second of the at least one lithium source electrode; or ii) a first polymer separator disposed between a first of the at least one non-lithium negative electrode and a first side of a first of the at least one positive electrode, a second polymer separator disposed between a second side of the first of the at least one positive electrode and the first side of the at least one lithium source electrode, a third polymer separator disposed between the second side of the at least one lithium source electrode and a first side of a second of the at least one non-lithium negative electrode, and a fourth polymer separator disposed between a second side of the second of the at least one non-lithium negative electrode and a second of the at least one positive electrode;

introducing an electrolyte into the electrochemical cell;
applying a voltage potential across the electrochemical cell, thereby pre-lithiating any of the at least one non-lithium negative electrode and the at least one positive electrode with lithium ions from the at least one lithium source electrode, and forming a rechargeable lithium-based battery;
cycling the battery through discharge and charge cycles; and
then, relithiating any of the at least one non-lithium negative electrode and the at least one positive electrode with lithium ions from the at least one lithium source electrode.

12. The method as defined in claim 11, wherein the lithium ion permeable negative electrode current collector and the a lithium ion permeable positive electrode current collector are capable of collecting and moving free electrons to and from an external circuit connected to the electrochemical cell.

13. The method as defined in claim 11, comprises forming an electrochemical cell including the first polymer separator disposed between the first of the at least one lithium source electrode and the first side of the at least one non-lithium negative electrode, the second polymer separator disposed between the second side of the least one non-lithium negative electrode and the first side of the at least one positive electrode, and the third polymer separator disposed between the second side of the at least one positive electrode and the second of the at least one lithium source electrode.

14. The method as defined in claim 11, comprises forming an electrochemical cell including the first polymer separator disposed between the first of the at least one non-lithium negative electrode and the first side of the first of the at least one positive electrode, the second polymer separator disposed between the second side of the first of the at least one positive electrode and the first side of the at least one lithium source electrode, the third polymer separator disposed between the second side of the at least one lithium source electrode and the first side of the second of the at least one non-lithium negative electrode, and the fourth polymer separator disposed between the second side of the second of the at least one non-lithium negative electrode the second of the at least one positive electrode.

15. An electrochemical cell comprising:
at least one non-lithium negative electrode in contact with a lithium ion permeable negative electrode current collector, the at least one non-lithium negative electrode having a first side and an opposing second side, wherein the at least one non-lithium negative electrode is lithium ion permeable;
at least one positive electrode in contact with a lithium ion permeable positive electrode current collector, the at least one positive electrode having a first side and an opposing second side, wherein the positive electrode is lithium ion permeable;
a lithium source electrode including lithium ions in an amount ranging from about 10% to about 50% greater than the lithium ion capacity of the at least one non-lithium negative electrode or the at least one positive electrode, and having a projected area that is at least 20% of the area of the at least one non-lithium negative electrode or the at least one positive electrode; and
one of:
i) a first polymer separator disposed between a first side of the lithium source electrode and the at least one non-lithium negative electrode, and a second polymer separator disposed between the second side of the lithium source electrode and the at least one positive electrode; or
ii) a first microporous polymer separator disposed between the lithium source electrode and a first side of a first of the at least one non-lithium negative electrode, a second microporous polymer separator disposed between a second side of the first of the at least one non-lithium negative electrode and a first side of a first of the at least one positive electrode, a third microporous polymer separator disposed between a second side of the first of the at least one positive electrode and a first side of a second of the at least one non-lithium negative electrode, and a fourth microporous polymer separator disposed between a second side of the second of the least one non-lithium negative electrode and a first side of a second of the at least one positive electrode.

16. The electrochemical cell as defined in claim 15, wherein the at least one non-lithium negative electrode includes a negative active material, a binder, and a conductive filler, and wherein the negative active material is selected from the group consisting of graphite, amorphous carbon, silicon, a silicon alloy, silicon oxide, a silicon-carbon composite, tin oxide, and titanium oxide.

17. The electrochemical cell as defined in claim 15, wherein the at least one positive electrode includes a positive active material, a binder, and a conductive filler, and wherein:
the positive active material is a non-lithium containing active material selected from the group consisting of sulfur, copper sulfide, iron sulfide, vanadium oxide, manganese oxide, cobalt oxide, a manganese-nickel-oxide spinel, a layered nickel-manganese-cobalt oxide, and an iron polyanion oxide; or
the at least one positive electrode includes a lithium containing positive active material selected from the group consisting of $LiMn_2O_4$, $Li(Ni_{0.5}Mn_{1.5})O_2$, $Li(Ni_{1/3}Mn_{1/3}Co_{1/3})O_2$, $LiCoO_2$, $LiNi_xM_{1-x}O_2$ (M is composed of any ratio of Al, Co, and Mg), $LiFePO_4$, $Li_2MSiO_4$ (M=Co, Fe, Mn), $xLi_2MnO_3 \cdot (1-x)LiMO_2$ (M is composed of any ratio of Ni, Mn and Co), $Li_{x+y}Mn_{2-y}O_4$ ($0<x<1$, $0<y<0.1$), and a high efficiency lithium nickel-manganese-cobalt oxide material.

18. The electrochemical cell as defined in claim 15, wherein the lithium source electrode is selected from the group consisting of lithium metal; lithiated carbon; a lithium-silicon alloy; a lithium-aluminum alloy; a lithium-tin alloy; lithium-metal oxides having a formula $LiMO_2$, wherein M is selected from the group consisting of Co, Ni, Mn, and combinations thereof; lithium-metal oxides having a formula $LiM_2O_4$, wherein M is selected from the group consisting of Mn, Ti, and combinations thereof; lithium-metal oxides having a formula $LiMxM'_{2-x}O_4$, wherein M and M' are independently selected from the group consisting of Mn and Ni and $0.1<x<0.9$; lithium-metal phosphates having a formula $LiMPO_4$, wherein M is selected from the group consisting of Fe, Mn, Co, and combinations thereof; and combinations thereof.

19. The electrochemical cell as defined in claim 15, comprising the first polymer separator disposed between the first side of the lithium source electrode and the at least one non-lithium negative electrode, and the second polymer separator disposed between the second side of the lithium source electrode and the positive electrode.

20. The electrochemical cell as defined in claim 15, comprising the first microporous polymer separator disposed between the lithium source electrode and the first side of the first of the at least one non-lithium negative electrode, the second microporous polymer separator disposed between the second side of the first of the at least one non-lithium negative electrode and the first side of the first of the at least one positive electrode, the third microporous polymer separator disposed between the second side of the first of the at least one positive electrode and the first side of the second of the at least one non-lithium negative electrode, and the fourth microporous polymer separator disposed between the second side of the second of the least one non-lithium negative electrode and the first side of the second of the at least one positive electrode.

* * * * *